United States Patent
Yasui et al.

(10) Patent No.: US 6,792,343 B2
(45) Date of Patent: Sep. 14, 2004

(54) ANTISKID BRAKING CONTROL SYSTEM

(75) Inventors: Yoshiyuki Yasui, Nagoya (JP); Katsuhiro Asano, Toyoake (JP); Yuji Muragishi, Nagoya (JP); Minekazu Momiyama, Chiryu (JP); Kenji Asano, Toyota (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 10/445,019

(22) Filed: May 27, 2003

(65) Prior Publication Data
US 2004/0019423 A1 Jan. 29, 2004

(30) Foreign Application Priority Data
May 24, 2002 (JP) .......................................... 2002-150237

(51) Int. Cl.[7] .................................................. G06F 7/00
(52) U.S. Cl. ............................. 701/71; 701/82; 701/41; 180/197
(58) Field of Search .............................. 701/41, 70, 71, 701/78, 79, 82, 83, 84, 87, 90; 303/139, 140, 141, 155, 163, 165, 174, 183, 189, 112; 180/197

(56) References Cited

U.S. PATENT DOCUMENTS

| | | | | |
|---|---|---|---|---|
| 5,713,642 A | * | 2/1998 | Okazaki | 303/121 |
| 5,765,929 A | * | 6/1998 | Hirano et al. | 303/112 |
| 6,208,921 B1 | * | 3/2001 | Tsunehara et al. | 701/41 |
| 6,236,926 B1 | * | 5/2001 | Naitou | 701/70 |

FOREIGN PATENT DOCUMENTS

| | | |
|---|---|---|
| JP | 60-148769 A | 8/1985 |
| JP | 8-85437 A | 4/1996 |
| JP | 3166472 B2 | 3/2001 |

* cited by examiner

Primary Examiner—Richard M. Camby
(74) Attorney, Agent, or Firm—Burns, Doane, Swecker & Mathis, L.L.P.

(57) ABSTRACT

An antiskid braking control system includes a wheel factor estimating means for estimating at least a wheel factor such as a side force of a vehicle front wheel and a front wheel slip angle based upon a vehicle state variable, a grip factor estimating means for estimating a grip factor of at least the vehicle front wheel based upon a change of a aligning torque depending upon the front wheel factor, and a control parameter adjusting means for adjusting a control parameter based upon the grip factor estimated.

6 Claims, 18 Drawing Sheets

ANTISKID BRAKING CONTROL SYSTEM

CROSS REFERENCE TO RELATED APPLICATIONS

This application is based on and claims priority under 35 U.S.C. §119 with respect to a Japanese Patent Application 2002-150237, filed on May 24, 2002, the entire content of which is incorporated herein by reference.

FIELD OF THE INVENTION

This invention generally relates to an antiskid braking control system for a vehicle for controlling braking force applied to a vehicle wheel such that the vehicle wheel is prevented from being locked and skidding upon vehicle braking operation. More particularly, this invention pertains to an antiskid braking control system for a vehicle for performing antiskid braking control with reference to an estimated grip factor indicative of a grip level of tire on a road surface in a lateral direction of a vehicle wheel.

BACKGROUND OF THE INVENTION

An antiskid braking control system is generally employed for preventing a vehicle wheel from being locked by increasing, maintaining, or decreasing wheel brake cylinder pressure. The wheel brake cylinder pressure control is performed based upon a slip ratio of the vehicle wheel (a vehicle wheel tire), a vehicle wheel acceleration (including a vehicle wheel deceleration), and the like.

Disclosed is an antiskid braking control system for an automobile in a Japanese Patent Laid-Open Publication No. 8-85437. This disclosed antiskid braking control system is employed for adjusting a start-up timing of pressure decrease when a vehicle is judged to have turned with an acute turning angle based upon a lateral acceleration, thereby enabling to perform smooth and stable braking operation upon the vehicle sharp turn. More particularly, the braking pressure is decreased or maintained at a normal start-up timing of the pressure decrease when the lateral acceleration of the vehicle does not exceed a predetermined level for judging the vehicle sharp turn. On the other hand, the braking force is decreased or maintained at an earlier timing than the normal start-up timing of the pressure decrease when the lateral acceleration of the vehicle exceeds the predetermined level.

Disclosed is a road frictional coefficient detecting device in a Japanese Patent Publication No. 3166472. According to a known work for detecting a road frictional coefficient disclosed in a Japanese Patent Laid-Open Publication No. 60-148769 which is cited in this Patent Publication, cornering force of a vehicle wheel is saturated when a lateral slip angle of the vehicle is increased to a certain angle amount during the vehicle turning and a saturation value of the cornering force corresponds to a road surface $\mu$. Therefore, the road surface $\mu$ can be obtained based upon the saturation value of the cornering force. However, the above-described Patent Publication indicates therein a problem of the known work that the road surface $\mu$ may be able to be detected only when a vehicle wheel grip condition is approximated to a limit value. In other words, it may be difficult for the known work to detect the road surface $\mu$ prior to the approximation of the vehicle wheel grip condition to the limit value. Further, according to the above-described Patent Publication, a relationship between a vehicle return moment and the cornering force as a reference for detecting the road surface $\mu$ enables to more effectively detect the road surface $\mu$ even in a zone with a relatively small cornering force rather than referring to the relationship between the vehicle lateral slip angle and the cornering force.

According to the above-described Japanese Patent Publication No. 3166472, when the detecting precision of the frictional coefficient is assumed to be relatively low, a final road frictional coefficient of a previous time is used as a final road frictional coefficient of every time. Further, the final road frictional coefficient of every time is assumed to be mostly set at the final road frictional coefficient of the last time which was detected during the road frictional coefficient being detected with a relatively high precision prior to the deteriorating of the detecting precision thereof. In the aforementioned assumptions, it was an objective of the invention disclosed in the Japanese Patent Publication that the road frictional coefficient be properly detected even when the detecting precision of the road frictional coefficient is relatively low in order to achieve the objective, the road surface $\mu$ during the detecting precision being relatively low should be determined in relation to designing of a vehicle control system, and the road surface $\mu$ of every time detected during the detecting precision being relatively low should be determined to be approximated not to a previous value but to a predetermined value.

In the above-described Japanese Patent Publication, disclosed is the road frictional coefficient detecting device which determines the final road frictional coefficient (a final value of this time) depending upon the detecting precision for detecting the road frictional coefficient. The detecting precision for detecting a provisional road frictional coefficient (a provisional value of this time) is estimated based upon the relationship between the return moment and the cornering force which were detected this time. When the estimated detecting precision is improved, the final value of this time is approximated to the provisional value of this time based upon at least the return moment and a predetermined road frictional coefficient. On the other hand, when the estimated detecting precision is deteriorated, the final value of this time is approximated to the predetermined road frictional coefficient.

According to a generally known antiskid braking control system, control parameters including an antiskid braking control starting threshold value are set corresponding to the road frictional coefficient (i.e. the road surface $\mu$). In this case, the maximum value of the road surfaced $\mu$ is required. Therefore, the road surface $\mu$ is used as the maximum road frictional coefficient unless there is particular description about the road frictional coefficient. However, according to the above-described Japanese Patent Laid-Open Publication No. 1996-85437, the lateral acceleration is referred to to judge whether or not the vehicle has turned with an acute turning angle. For example, even when the vehicle is turning on a low-friction (low $\mu$) road with friction force somewhere around a limit thereof, the lateral acceleration of the vehicle is relatively large. In this case, the braking pressure is decreased or maintained at the normal start-up timing of the pressure decrease. On the other hand, when the vehicle is turning with a relatively large grip force on a high-friction (high $\mu$) road, there is still a margin to the limit of the friction force. However, the braking pressure is decreased or maintained at an earlier timing than the normal start-up timing of the pressure decrease.

When the vehicle is traveling, the vehicle is slipped due to difference between a vehicle traveling speed, i.e. a tire traveling speed and a tire peripheral velocity. A longitudinal force hence is generated in response to a so-called slip ratio.

Further, a slip angle is generated due to a difference between a vehicle traveling direction, i.e. a tire traveling direction and a tire oriented direction. A lateral force is hence generated in response to a so-called front wheel slip angle. The vehicle is accelerated, decelerated, or turned in a flat surface being parallel with the road in accordance with the longitudinal force and the lateral force. Therefore, vehicle turn characteristics are not uniform even on a uniform surface. The vehicle turn characteristics vary due to the road conditions, and the relationship between the road surface and the tire.

According to the road frictional coefficient detecting device disclosed in the aforementioned Japanese Patent Publication No. 3166472, the final road frictional coefficient of this time is approximated to the predetermined road frictional coefficient when the detecting precision is deteriorated. Therefore, the maximum road frictional coefficient can be estimated as accurately as possible when the detecting precision is deteriorated. This type of road frictional coefficient detecting device can be applicable for the antiskid braking control system. However, the maximum value of the road frictional coefficient can not be estimated at a proper timing for adjusting the control parameters for the antiskid braking control system.

The maximum value of the road frictional coefficient cannot be obtained at the present moment while the vehicle has been traveling. Therefore, it may be difficult to comprehend ratio of the road frictional coefficient at the present moment relative to the maximum frictional coefficient. For example, when the side force is applied to the tire somewhere around 0.2G, the tire grip factor varies depending upon the condition of the road of which acceptable maximum side force is somewhere around 1G or 0.5G. That is, the grip factor of the vehicle front wheel varies in accordance with the acceptable side force. In the known antiskid braking control system, the maximum value of the road frictional coefficient is estimated such that the control parameter is set for controlling pressure reduce with reference to the maximum value of the road frictional coefficient. However, the braking force can be effectively controlled at an earlier timing prior to the set of the control parameter if the grip factor can be estimated prior to the set of the control parameter.

The present invention therefore seeks to provide properly setting a control parameter at an earlier timing prior to the reach to the limit of the friction force such that an antiskid braking control can be-performed assuring stable braking operation even while the vehicle has turned.

SUMMARY OF THE INVENTION

According to an aspect of the present invention, an antiskid braking control system includes a braking force generating means for generating braking force applied to a vehicle wheel, a braking force controlling means for controlling the braking force generated by the braking force generating means, and a vehicle wheel speed detecting means for detecting a vehicle wheel speed. A control parameter for the braking force controlling means is determined based upon at least the vehicle wheel speed detected by the vehicle wheel speed detecting means, and the braking force controlling means is controlled in accordance with the determined control parameter.

The antiskid braking control system further includes a steering factor detecting means for detecting at least one of steering factors including a steering torque and steering effort applied to a steering system extending from a steering wheel to a suspension of a vehicle, an aligning torque estimating means for estimating aligning torque produced on at least a wheel of the vehicle on the basis of the steering factor detected by the steering factor detecting means, a vehicle state variable detecting means for detecting a state variable of the vehicle, a wheel factor estimating means for estimating at least one of wheel factors including a side force and slip angle applied to the wheel on the basis of the state variable detected by the vehicle state variable detecting means, a grip factor estimating means for estimating a grip factor of at least a tire of the wheel, in accordance with a relationship between the alignment torque estimated by the aligning torque estimating means and the wheel factor estimated by the wheel factor estimation means, and a control parameter adjusting means for adjusting the control parameter based upon the grip factor estimated by the grip factor estimating means. The vehicle state variable includes a variable associated with a driven vehicle such as a vehicle speed, a lateral acceleration, a yaw rate, a steering angle, and the like.

The antiskid braking control system further includes a reference aligning torque setting means for setting a reference aligning torque based upon the wheel factor estimated by the wheel factor estimating means and the aligning torque estimated by the aligning torque estimating means. The grip factor estimating means estimates at least the grip factor of the vehicle front wheel based upon a comparison between the reference aligning torque and the aligning torque.

The control parameter adjusting means adjusts a control start threshold value for staring the braking force control by the braking force controlling means based upon the grip factor estimated by the grip factor estimating means. Further, the control parameter adjusting means adjusts a control amount of the braking force by the braking force controlling means based upon the grip factor estimated by the grip factor estimating means. Especially, it is preferable that the braking force applied to vehicle rear wheel is adjusted based upon the grip factor.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Preferred embodiments of the present invention will be described hereinbelow in detail with reference to the accompanying drawings.

Figure 1:
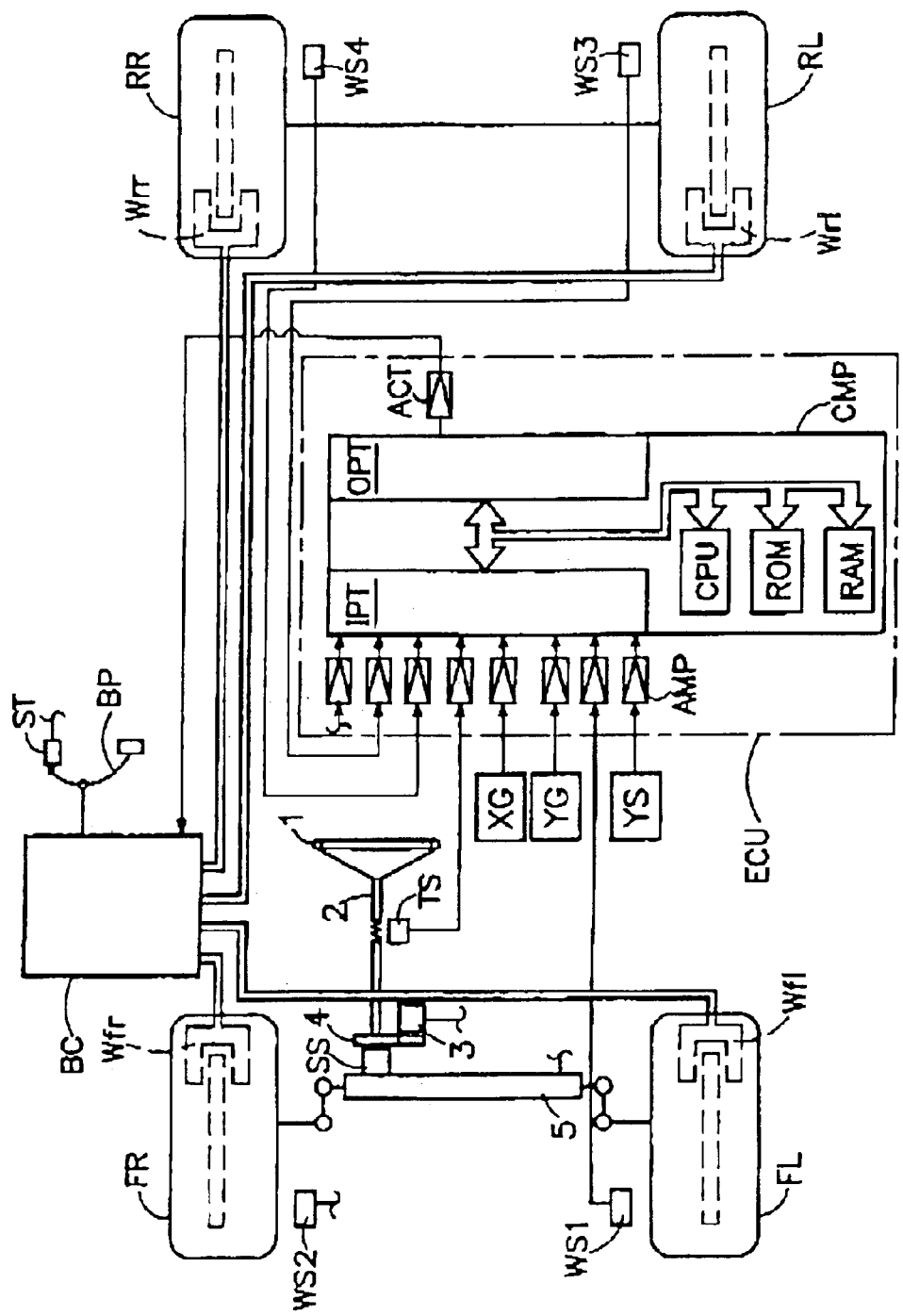
FIG. 1 is a block view illustrating an entire structure of a vehicle with a built-in antiskid braking control system according to the embodiment of the present invention.

Here will be described an entire structure of a vehicle With a built-in antiskid braking control system according to the embodiment of the present invention with reference to FIG. 1. The vehicle is provided with an electric power steering (EPS) device that has been commercially available so as to decrease a driver steering force of a steering wheel. In the EPS device, a steering torque Tstr applied to a steering shaft 2 is detected by a steering torque sensor TS. An EPS motor (i.e. an electrically-driven motor) is controlled in response to the detected steering torque Tstr. A front-left vehicle wheel FL and a front-right vehicle wheel FR are steered via a speed reduction gear 4 and a rack and pinion 5. According to the embodiment of the present invention, a hydraulic pressure generating means is employed as a braking force generating means. A hydraulic pressure controlling means is employed as a braking force controlling means. The hydraulic pressure generating means according to the embodiment of the present invention is provided with a master cylinder MC and a hydraulic booster HB which are included in a brake pressure control device BC which is activated in response to operation of a brake pedal BP.

Figure 2:
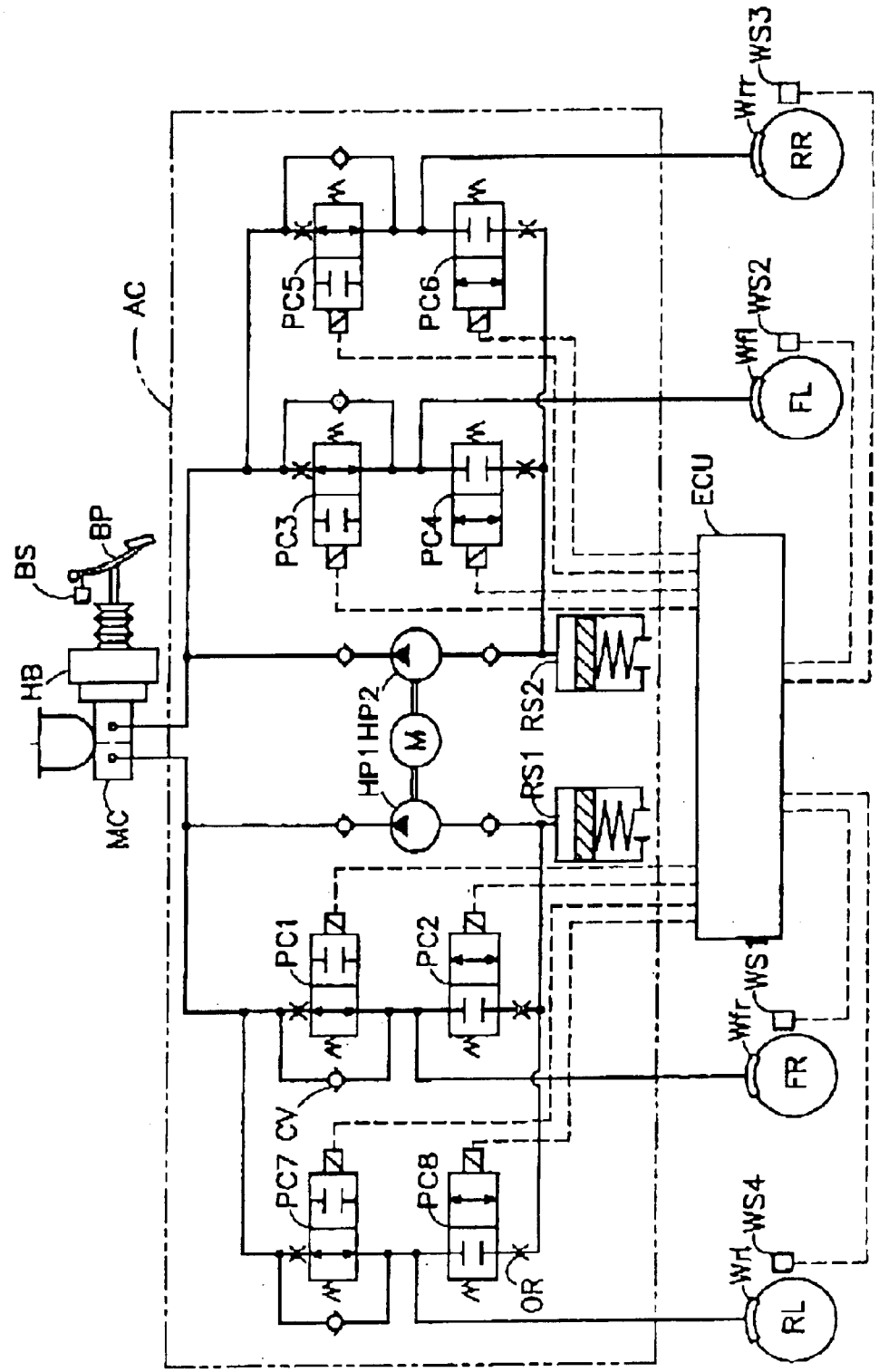
FIG. 2 is a block view illustrating a structure of a brake pressure control device according to the embodiment of the present invention.

Wheel brake cylinders Wfr, Wfl, Wrr, and Wrl are mounted on the front-right wheel FR, the front-left wheel FL, a rear-right wheel RR, and a rear-left wheel RL, respectively. These wheel brake cylinders Wfr, Wfl, Wrr, and Wrl are connected to the brake pressure control device BC. The vehicle wheel FL represents a front-left vehicle wheel from a view point of a driver seat, the vehicle wheel FR represents a front-right vehicle wheel, the vehicle wheel RL represents a rear-left vehicle wheel, and the vehicle wheel RR represents a rear-right vehicle wheel. As seen in FIG. 2, the wheel brake cylinders for the respective vehicle wheels are connected to the brake pressure control device BC so as to establish a so-called diagonal hydraulic circuit system. Alternatively, they can be connected to the brake pressure control device BC so as to establish a longitudinal hydraulic circuit system.

The respective vehicle wheels FR, FL, RR, and RL are provided with vehicle wheel speed sensors WS1, WS2, WS3, and WS4 (i.e. a vehicle wheel speed detecting means) which are all connected to an electronic control unit ECU. A rotational speed of each vehicle wheel, i.e. a pulse signal representing a pulse number being proportional to each vehicle wheel speed is inputted into the ECU. The ECU is further connected to a stop switch ST turned on in response to depression of the brake pedal BP, a steering angle sensor SS for detecting a steering angle $\theta$ h of each vehicle wheel FL and FR, a longitudinal acceleration sensor XG for detecting a vehicle longitudinal acceleration Gx, a lateral acceleration sensor YG for detecting a vehicle lateral acceleration Gy, a yaw rate sensor YS for detecting a vehicle yaw rate $\gamma$, the steering torque sensor TS, and a rotation angle sensor (not shown) for detecting a rotation angle of the EPS motor 3. The steering torque sensor TS is provided as a part of the EPS system. Alternatively, the steering torque sensor TS can be provided separately from the EPS system.

As seen in FIG. 2, an actuator AC for antiskid braking control (ABS) is disposed between the master cylinder MC and the wheel brake cylinders Wfr, Wfl, Wrr, and Wrl. The ABS actuator AC is employed as the hydraulic pressure controlling means. Normally-open type solenoid valves PC1 and PC7 are disposed in a hydraulic pressure conduit connecting an output port of the master cylinder MC with the respective wheel brake cylinders Wfr and Wrl. A discharging port of a hydraulic pressure pump HP1 is connected to a hydraulic conduit extending between the master cylinder MC and the valves PC1 and PC7. In the meantime, normally-open type solenoid valves PC3 and PC5 are disposed in a hydraulic pressure conduit connecting the other output port of the master cylinder MC with the respective wheel brake cylinders Wfl and Wrr. A discharging port of a hydraulic pressure pump HP2 is connected to a hydraulic conduit extending between the master cylinder MC and the valves PC3 and PC5. The hydraulic pressure pumps HP1 and HP2 are activated by an electric motor M. When the hydraulic pressure pumps HP1 and HP2 operate, each hydraulic conduit is supplied with brake fluid applied with a predetermined pressure.

The wheel brake cylinders Wfr and Wrl are connected to normally-closed type solenoid valves PC2 and PC8, and downstream sides of the valves PC2 and PC8 are connected to a reservoir RS1 and an inhaling side of the hydraulic pressure pump HP1. The wheel brake cylinders Wfl and Wrr are connected to normally-closed type solenoid valves PC4 and PC6, and downstream sides of the valves PC4 and PC6 are connected to a reservoir RS2 and an inhaling side of the hydraulic pressure pump HP2. Each reservoir RS1 and RS2 is provided with a piston and a spring and accumulates brake fluid drained from each wheel brake cylinder via each solenoid valve PC2, PC4, PC6, and PC8.

Each SOL valve PC1 through PC8 is a two-port and two-position electromagnetic switching valve. When each SOL valve is not electrically excited, each SOL valve is selectively located at a first position, as illustrated in FIG. 2. In this case, each wheel brake cylinder Wfr, Wfl, Wrr, and Wrl communicates with the master cylinder MC. On the other hand, when each SOL valve is electrically excited, each SOL valve is selectively located at a second position. In this case, the communication between the master cylinder MC and each brake cylinder Wfr, Wfl, Wrr, and Wrl is interrupted and each wheel brake cylinder communicates with the reservoir RS1 or RS2. Check valves CV allow flow of the brake fluid in a direction of the master cylinder MC from the respective wheel brake cylinders and interrupt flow of the brake fluid in a reverse direction. The ABS actuator AC is further provided with orifices OR.

As described above, the brake pressure in the wheel brake cylinders Wfr, Wfl, Wrr, and Wrl can be increased, decreased, or maintained in response to electrically exciting operation applied to the SOL valves PC1 through PC8. That is, when the SOL valves PC1 through PC8 are not electrically excited, brake pressure is supplied to the wheel brake cylinders from the master cylinder MC and the hydraulic pressure pump HP1 (or the hydraulic pressure pump HP2), wherein the brake pressure in the wheel brake cylinders are increased. On the other hand, when the SOL valves PC1 through PC8 are electrically excited, the wheel brake cylinders communicate with the reservoir RS1 (or the reservoir RS2), wherein the brake pressure in the wheel brake cylinders is decreased. Further, when the normally-open type SOL valves PC1, PC3, PC5, and PC7 are electrically excited and the normally-closed type SOL valves PC2, PC4, PC6, and PC8 are not electrically excited, the brake pressure in the wheel brake cylinders can be maintained. Therefore, hydraulic pressure control can be performed by repeatedly applying the electrically exciting operation to the SOL valves in response to duty ratio regulated in accordance with the vehicle wheel conditions. In the hydraulic pressure control, the brake pressure in the wheel brake cylinders are generally increased in accordance with a pressure increasing mode by pulse cycles per unit of time, and the brake pressure therein are generally decreased in accordance with a pressure decreasing mode by pulse cycles per unit of time.

The ECU is connected to the SOL valves PC1 through PC8 so as to control the electrically exciting operation applied to the respective SOL valves. The ECU is connected to the electric motor M so as to control driving operation of the electric motor M. The ABS actuator AC according to the embodiment of the present invention includes the SOL valves PC1 and PC8. Alternatively, the brake pressure in each wheel brake cylinder can be controlled by a linear solenoid valve (not shown). Further, the brake pressure is employed as the braking force generating means. Alternatively, braking torque can be mechanically applied to the vehicle wheels by use of a motor and the like.

Figure 3:
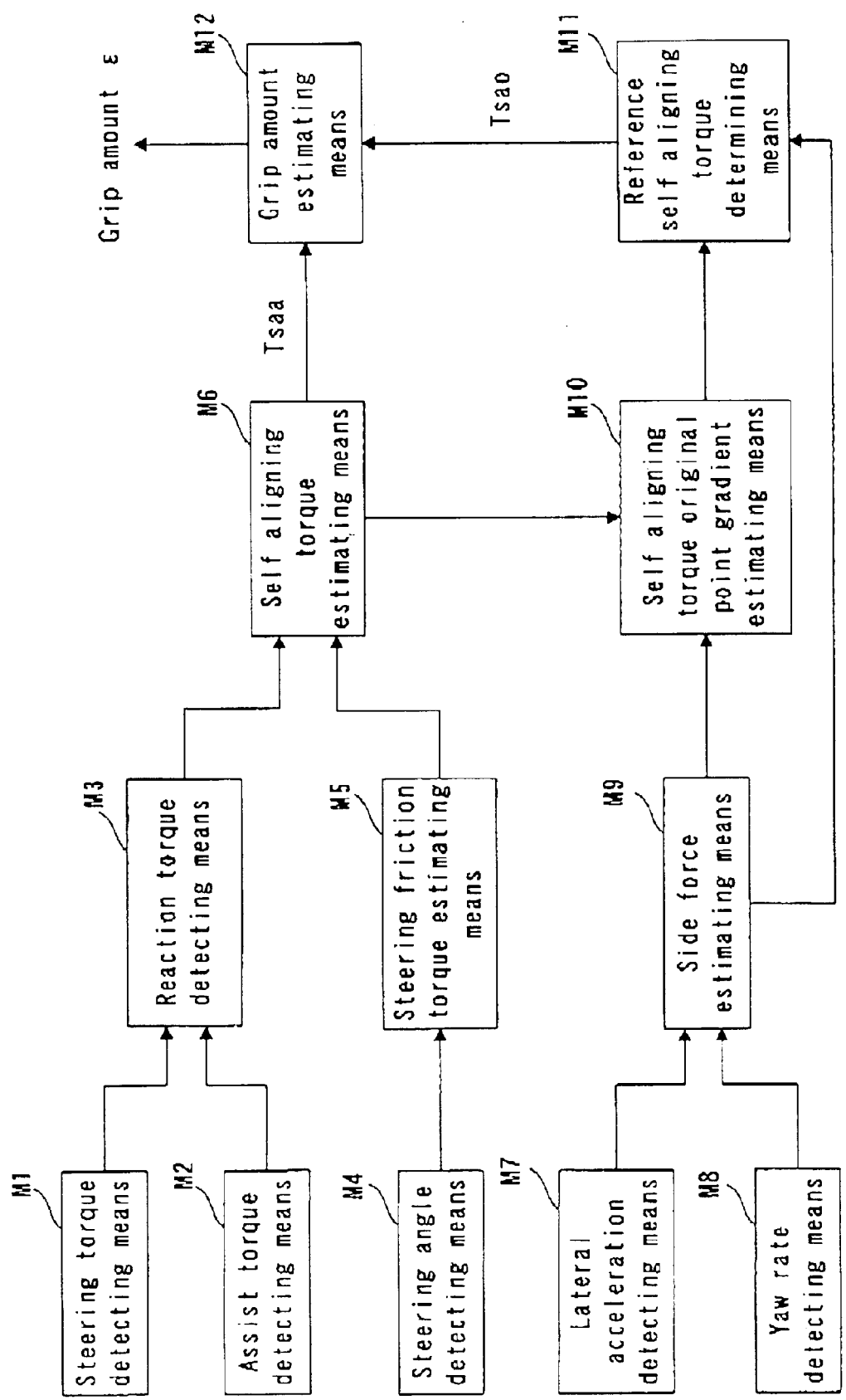
FIG. 3 is a block view explaining estimation of a grip factor according to the embodiment of the present invention.
Figure 4:
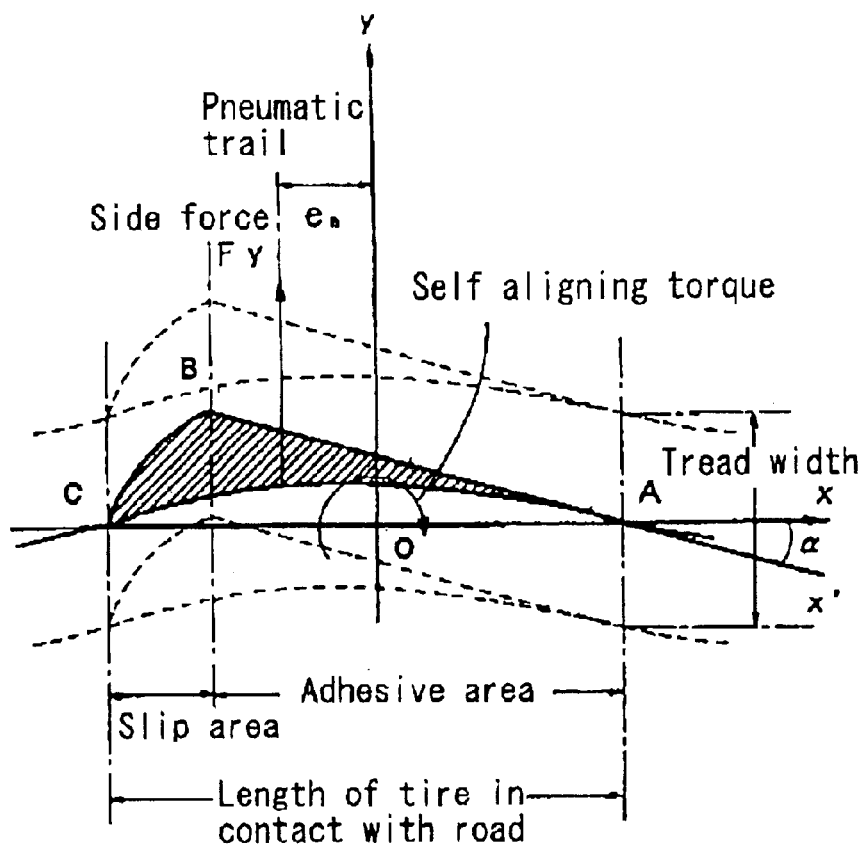
FIG. 4 is a graph illustrating a relationship between a aligning torque and a side force while a tire turns being laterally slipped.

As seen in FIG. 3, the ECU of the present invention includes a method of estimating a grip factor. Hereinafter, the grip factor estimation is described with reference to FIGS. 4 through 13. First of all, it is disclosed in AUTOMOTIVE ENGINEERING HANDBOOK, First Volume, for BASIC & THEORY, issued on Feb. $1^{st}$, 1990 by Society of Automotive Engineers of Japan, Inc., Pages 179 and 180, such a state that a tire rotates on a road, skidding at a slip angle $\alpha$, as shown in a part of FIG. 4 of the present application. As indicated by broken lines in FIG. 4, a tread surface of the tire contacts a road surface at a front end of the contacting surface including Point (A) in FIG. 4, and moves with the tire advanced, being adhesive to the road surface up to Point (B). The tire begins to slip when a deformation force by a lateral shearing deformation has become equal to a friction force, and departs from the road surface at a rear end including Point (C). In this case, a side force Fy produced on the overall contacting surface equals to a product of a deformed area of the tread in its lateral direction (as indicated by hutching area in FIG. 4) multiplied by its lateral elastic coefficient per unit area. As shown in FIG. 4, a point of application of force for the side force Fy is shifted rearward (leftward in FIG. 4) from a point (O) on the center line of the tire, by a distance ($e_n$) which is called as a pneumatic trail. Accordingly, a moment Fy·$e_n$ becomes an aligning torque (Tsa), which acts in such a direction to reduce the slip angle $\alpha$, and which may be called as a self-aligning torque.

Next will be explained the case where the tire is installed on a vehicle, with reference to FIG. 5 which simplified FIG. 4. With respect to steered wheels of a vehicle, in general, a caster angle is provided so that a steering wheel can be returned to its original position smoothly, to produce a caster trail ($e_c$). Therefore, the tire contacts the road surface at a point (O'), so that the moment for forcing the steering wheel to be positioned on its original position becomes Fy·($e_n+e_c$). When a lateral grip force of the tire is reduced to enlarge the slip area, the lateral deformation of the tread will result in changing a shape of ABC in FIG. 5 into a shape of ADC. As a result, the point of application of force for the side force Fy will be shifted forward in the advancing direction of the vehicle, from Point (H) to Point (J). That is, the pneumatic trail ($e_n$) will be reduced. Therefore, even in the case where the same side force Fy acts on the tire, if the adhesive area is relatively large and the slip area is relatively small, i.e., the lateral grip force of the tire is relatively large, the pneumatic trail ($e_n$) will be relatively large, so that the aligning torque Tsa will be relatively large. On the contrary, it the lateral grip force of the tire is lessened, and the slip area is enlarged, then the pneumatic trail ($e_n$) will become relatively small, so that the aligning torque Tsa will be reduced.

As described above, by monitoring the variation of the pneumatic trail ($e_n$), the grip level of the tire in its lateral direction can be detected. And, the variation of the pneumatic trail ($e_n$) results in the aligning torque Tsa, on the basis of which can be estimated a grip factor indicative of a grip level of the tire in its lateral direction, with respect to a front wheel for example (hereinafter simply referred to as grip factor). With respect to the grip factor, it can be estimated on the basis of a margin of side force for road friction, as described later in detail.

Figure 5:
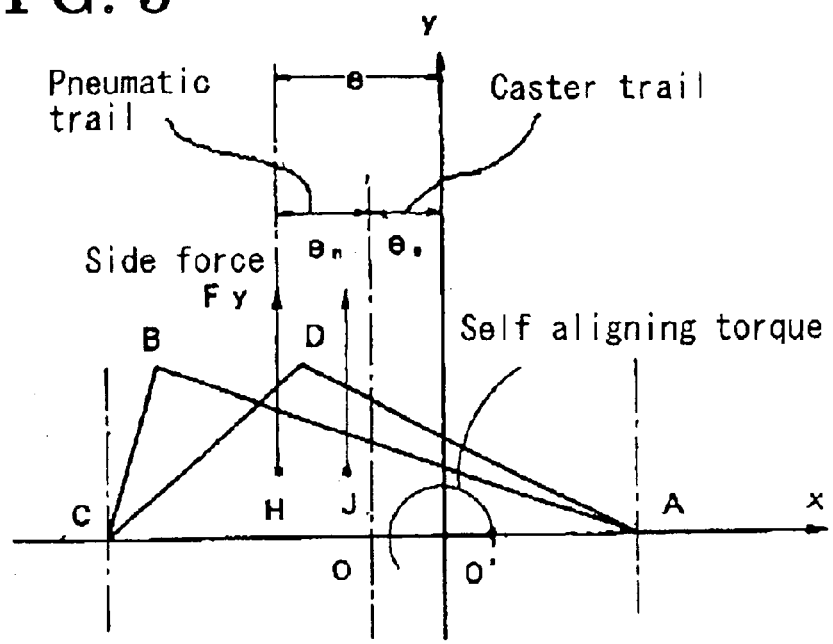
FIG. 5 is a graph easily illustrating the relationship between the aligning torque and the side force.
Figure 6:
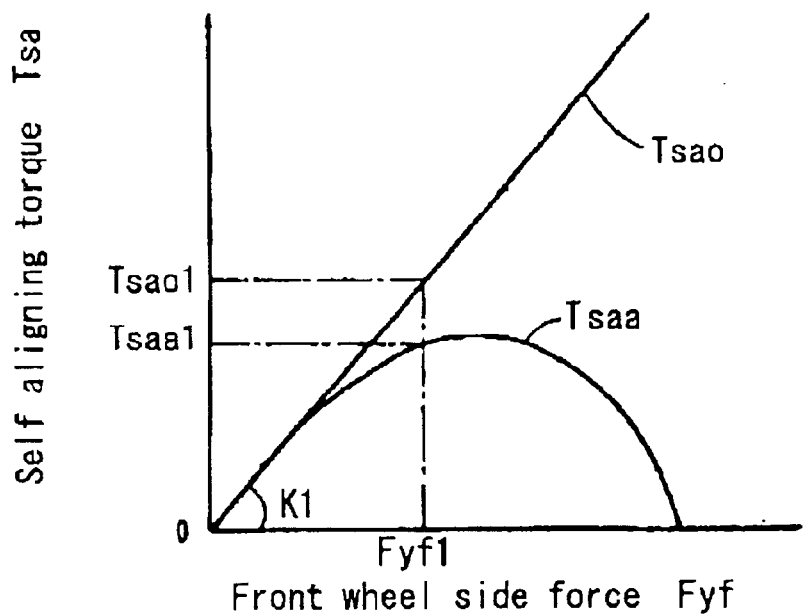
FIG. 6 is a graph illustrating characteristics of the aligning torque relative to a front wheel side force according to the embodiment of the present invention.

As explained heretofore referring to FIGS. 4 and 5, the characteristic of the aligning torque to the side force of the front wheel will be the one as indicated by Tsaa in FIG. 6. In this case, when the actual aligning torque is indicated by Tsaa and the side force of the front wheel is indicated by Fyf, the actual aligning torque Tsaa can be given by Tsaa=Fyf·(en+ec), wherein a nonlinear characteristic of the actual aligning torque Tsaa to the front side force Fyf indicates a linear variation of the pneumatic trail (en). Therefore, a gradient K1 of the actual aligning torque Tsaa to the front side force Fyf is identified in the vicinity of the origin (O), to obtain a characteristic as indicated by the aligning torque characteristic in the state that the tire is completely gripped, i.e., reference aligning torque Tsao. As for the gradient K1, may be employed a predetermined value which is obtained by an experiment as an initial value, and may be identified to be corrected during a normal driving operation of the vehicle, where the grip factor is large. The actual aligning torque Tsaa can be obtained in accordance with a calculation as described later in detail.

A grip factor $\epsilon$ can be estimated based upon the actual aligning torque Tsaa relative to the reference aligning torque Tsao. For example, when a front wheel side force Fyf1 is applied to the front wheel, the reference aligning torque of the front wheel is denoted with Tsao1 (=K1·Fyf1) and the actual aligning torque thereof is denoted with Tsaa1. In this case, the front wheel grip factor $\epsilon$ can be calculated in accordance with an equation: $\epsilon$=Tsaa1/Tsao1.

As described above, the grip factor of the vehicle wheel can be estimated based upon the change of the actual aligning torque Tsaa relative to the side force Fy. The grip factor of the vehicle wheel can be estimated as illustrated in FIG. 3. The antiskid braking control system according to the embodiment of the present invention includes a steering torque detecting means M1 and an assist torque detecting means M2 as a steering factor detecting means for detecting at least one (e.g. a steering torque) among various steering factores, including a steering torque and a steering force, which are applied to a steering system from the vehicle steering wheel 1 to a suspension. A reaction torque is detected by a reaction torque detecting means M3 based upon the detected steering torque and assisted torque. The above-described means are included in the EPS and are described in more detail later. The steering angle is detected by the steering angle sensor SS as a steering angle detecting means M4 (i.e. a vehicle state variable detecting means). A steering friction torque can be estimated by a steering friction torque estimating means M5 based upon the detected steering angle.

The actual aligning torque Tsaa of each front wheel FL and FR is estimated by a aligning torque estimating means M6 based upon the detected reaction torque and steering friction torque. The antiskid braking control system further includes a lateral acceleration detecting means M7 (i.e. the vehicle state variable detecting means) and a yaw rate detecting means M8 (i.e. the vehicle state variable detecting means). At least a front wheel factor among front wheel factors including the side force applied to the front wheels FL and FR and the front wheel slip angle can be estimated by a front wheel factor estimating means based upon the signals detected by the lateral acceleration detecting means M7 and the yaw rate detecting means M8. As illustrated in FIG. 3, according to the embodiment of the present invention, the front wheel side force Fyf is estimated as the front wheel factor by a side force estimating means M9.

The front wheel side force Fyf can be estimated based upon the detected lateral acceleration and yaw rate in accordance with the following equation:

$$Fyf=(Lr \cdot m \cdot Gy + Iz \cdot d\gamma/dt)/L.$$

Lr represents a distance from a vehicle center of gravity to a rear wheel axis, m represents a vehicle mass, L represents a wheel base, Iz represents a yaw moment of inertia, Gy represents a lateral acceleration, and $d\gamma/dt$ represents a differential value of the yaw rate per time.

Further, the reference aligning torque can be determined based upon the actual aligning torque Tsaa estimated by the aligning torque estimating means M6 and the front wheel side force Fyf estimated by the side force estimating means M9 by a reference aligning torque setting means M11. For example, a gradient of the aligning torque around the original point is estimated by a aligning torque original point gradient estimating means M10. The reference aligning torque can be determined by the reference aligning torque setting means M11 based upon the estimated gradient and the front wheel side force. The grip factor $\epsilon$ of the front wheel can be estimated by a grip factor estimating means M12 based upon the reference aligning torque determined by the reference aligning torque setting means M11 and the aligning torque estimated by the aligning torque estimating means M6.

More particularly, the gradient K1 of the aligning torque somewhere around the original point in FIG. 6 is obtained based upon the actual aligning torque Tsaa estimated by the aligning torque estimating means M6 and the front wheel side force Fyf estimated by the side force estimating means M9. The reference aligning torque Tsao is estimated based upon the gradient K1 and the front wheel side force Fyf in accordance with an equation: Tsao=K1·Fyf. The actual aligning torque Tsaa is compared with the reference aligning torque Tsao and the grip factor $\epsilon$ is obtained in accordance with an equation: $\epsilon$=Tsaa/Tsao.

As described above, electric current supplied to the EPS motor is proportionally related to the assist torque. The reaction torque can be easily estimated based upon the assist torque and the steering torque detected by the steering torque sensor TS (the steering torque detecting means M1). The estimation of the reaction torque is described later. A difference between a maximum value of the reaction torque during the increase of the turning degree of the steering wheel 1 and a reaction torque during the decrease thereof is calculated as the friction torque by the steering friction torque estimating means M5. The friction torque of the steering system is sequentially corrected, wherein the actual aligning torque Tsaa can be properly estimated. The friction torque correction is described later. Alternatively, the actual aligning torque can be measured based upon a signal detected by a load cell mounted on a steering shaft (not shown) or a deflection meter mounted on a suspension member.

As illustrated in FIGS. 8 through 13, the front wheel slip angle is referred to as the front wheel factor in substitution for the front wheel side force so as to detect the grip factor $\epsilon$ according to the other mode of the embodiment. The means M1 through M6 are employed in the same manner again, the reaction torque and the steering friction torque are obtained, and the aligning torque can be estimated. Therefore, the tire grip factor is estimated based upon the front wheel skip angle and the aligning torque. The front wheel slip angle is estimated based upon the steering angle, the yaw rate, the lateral acceleration, and the vehicle speed. The signals detected by the steering angle detecting means M4, the lateral acceleration detecting means M7, and the yaw rate detecting means M8 are inputted to a front wheel slip angle estimating means 9y along with a signal detected by a vehicle speed detecting means M9x (i.e. the vehicle state variable detecting means).

A vehicle slip angle speed dβ/dt is obtained by the front wheel slip angle estimating means M9y based upon the yaw rate, the lateral acceleration, and the vehicle speed. A vehicle slip angle β is obtained by integrating the vehicle slip angle speed dβ/dt. A front wheel slip angle αf is then calculated based upon the vehicle slip angle β, the vehicle speed, the steering angle, and a vehicle specification. Alternatively, the vehicle slip angle β can be estimated based upon a vehicle model or based upon an integral calculation and the vehicle model.

An original point gradient of the aligning torque is identified by the aligning torque original point gradient estimating means M10 based upon the estimated actual aligning torque Tsaa and the front wheel slip angle αf. The reference aligning torque is determined by the reference aligning torque setting means M11 based upon the gradient and the front wheel slip angle αf. The actual aligning torque Tsaa is compared with the reference aligning torque Tsao and the front wheel tire grip factor ε is estimated by the grip factor estimating means M12 based upon the comparison.

Figure 9:
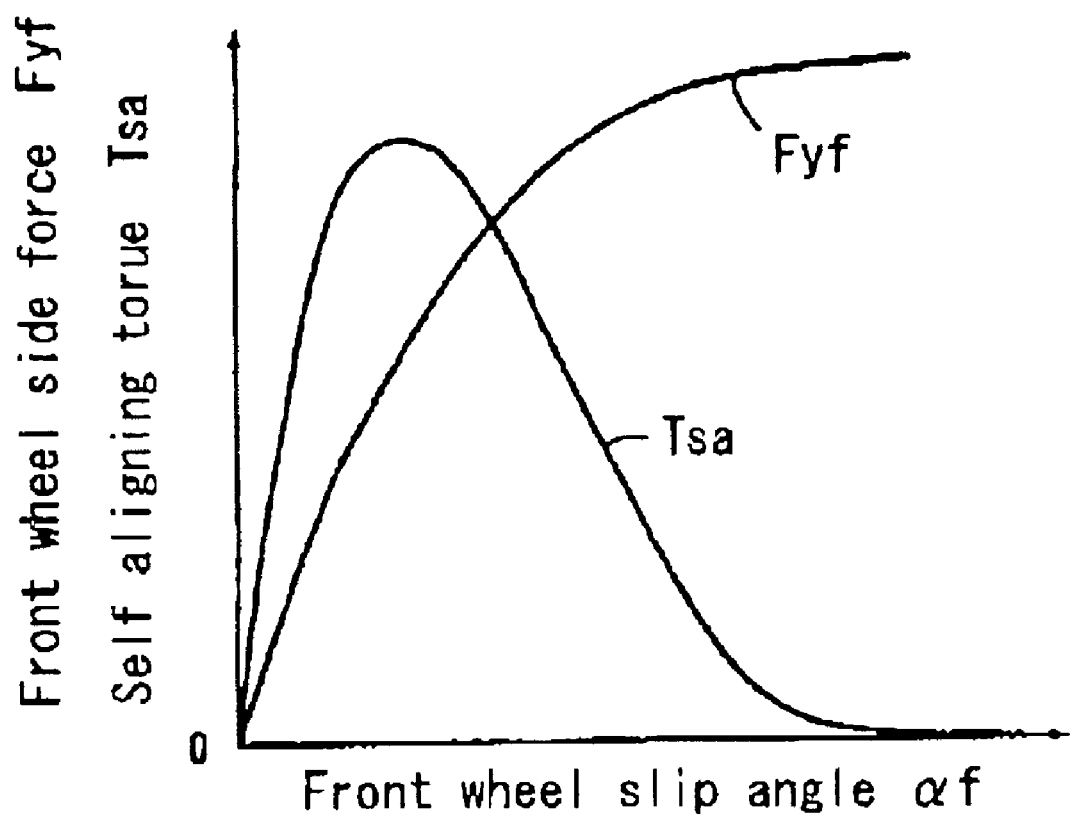
FIG. 9 is a graph illustrating a relationship of a front wheel side force and a aligning torque relative to a front wheel slip angle according to the modification of the embodiment of the present invention.
Figure 10:
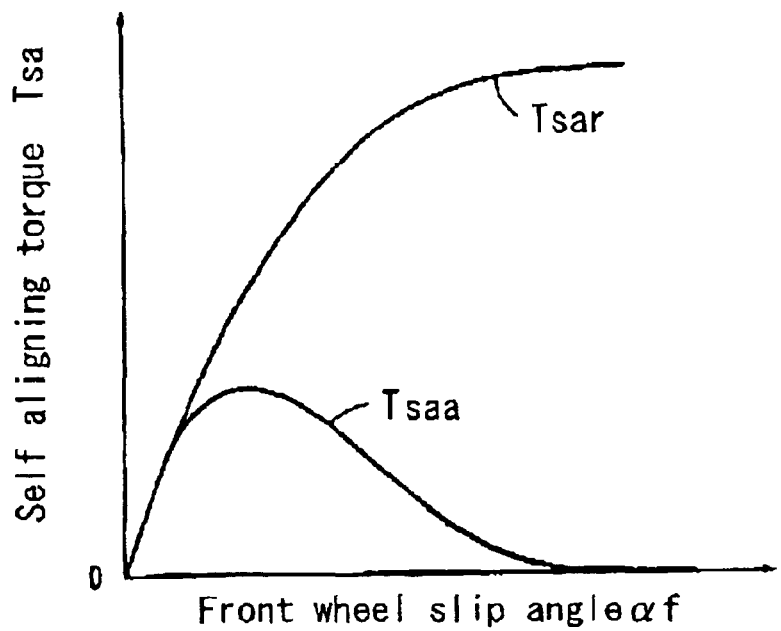
FIG. 10 is a graph illustrating a relation of the aligning torque relative to the front wheel slip angle according to the modification of the embodiment of the present invention.

As illustrated in FIG. 9, a relationship of the front wheel side force Fyf and the aligning torque Tsa relative to the front wheel slip angle αf is nonlinearly characterized as illustrated in FIG. 9. The aligning torque Tsa is obtained by multiplying the front wheel side force Fyf by a trail e (=$e_n$+$e_c$). Therefore, when the front wheel has been under the gripped condition, i.e. when the pneumatic trail en is under the fully gripped condition, the aligning torque is nonlinearly characterized as denoted with a symbol Tsar in FIG. 10.

Figure 11:
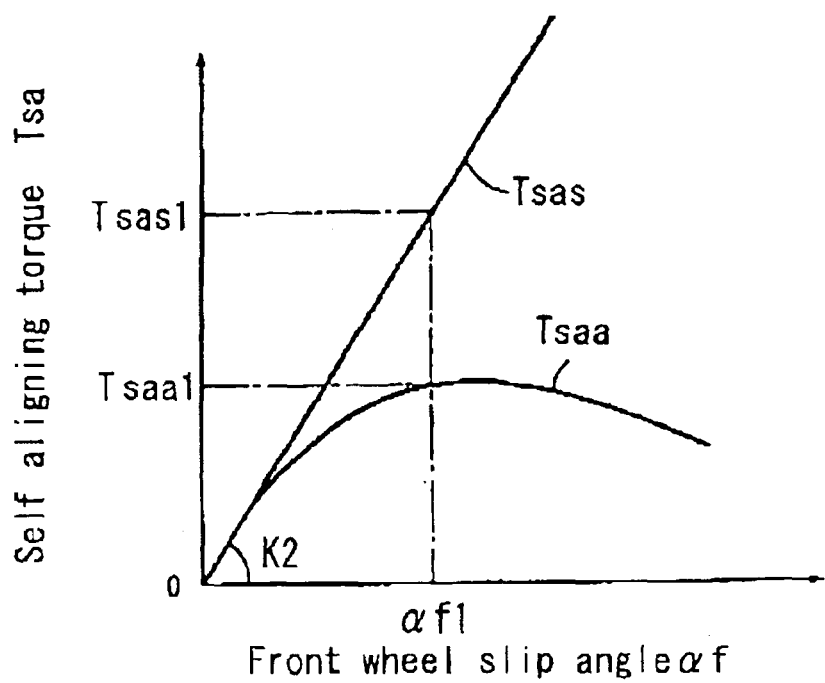
FIG. 11 is a graph illustrating a relation of the aligning torque relative to the front wheel slip angle according to the modification of the embodiment of the present invention.

However, according to the embodiment of the present invention, a reference aligning torque is set to possess a feature illustrated with a symbol Tsas in FIG. 11 by assuming the aligning torque under the fully gripped condition to be linear and by obtaining a gradient K2 of the aligning torque Tsa relative to the front wheel slip angle somewhere around the original point. For example, when the front wheel slip angle is a value denoted with a symbol αf1, the reference aligning torque Tsas1 can be calculated in accordance with an equation: Tsas1=K2·αf1. The grip factor ε is therefore obtained in accordance with an equation: ε=Tsaa1/Tsas1=Tsaa1/(K2·αf1).

Figure 12:
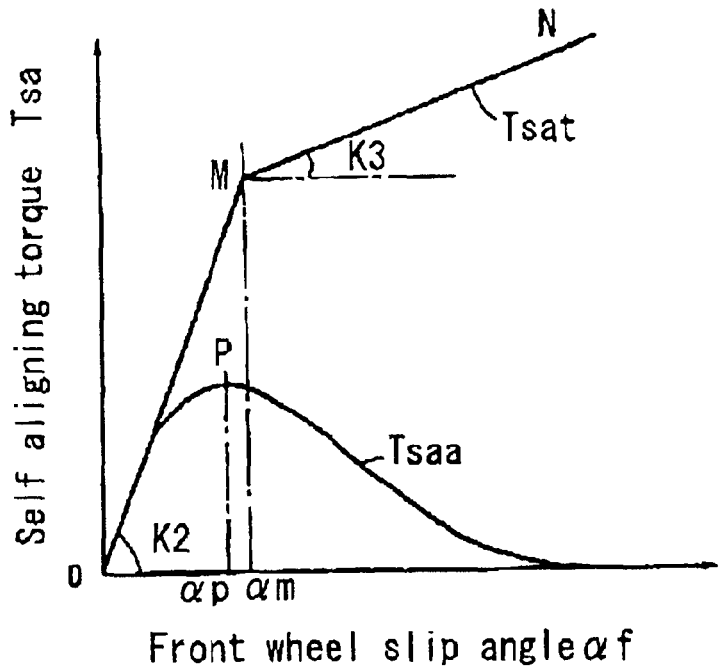
FIG. 12 is a graph illustrating a relation of the aligning torque relative to the front wheel slip angle according to the modification of the embodiment of the present invention.

According to the above-described method for setting the reference aligning torque Tsas as illustrated in FIG. 11, the reference aligning torque is assumed to possess the linear feature, thereby increasing an error for estimating the grip factor in a zone possessing a relatively large front wheel slip angle αf. In this case, precision for detecting the tire grip factor may be deteriorated. Therefore, it will be preferable that the aligning torque is designed to possess a gradient K3 when the front wheel slip angle exceeds a predetermined value. It will be further preferable that the nonlinear feature of the reference aligning torque is approximated to the feature as being illustrated with a line O-M-N in FIG. 12. In this case, it is preferable that the gradient K3 of the aligning torque is experimentally predetermined and the gradient K3 is identified and corrected during the vehicle travelling. It is also preferable that the point M in FIG. 12 is determined with reference to an inflection point (a point P) of the actual aligning torque Tsaa. For example, the point M can be determined at a point of a front wheel slip angle αm on a horizontal axis. The value of the front wheel slip angle αm is greater than a front wheel slip angle αp by a predetermined value.

Figure 13:
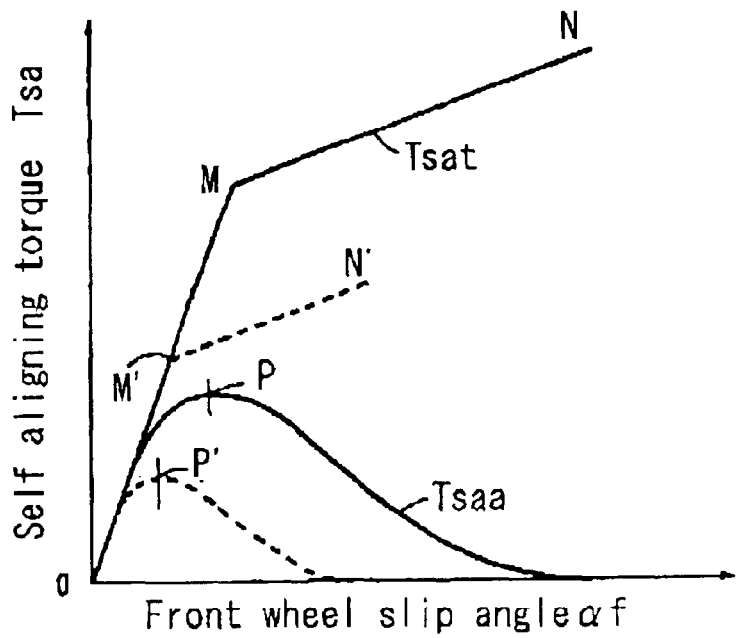
FIG. 13 is a graph illustrating a relation of the aligning torque relative to the front wheel slip angle according to the modification of the embodiment of the present invention.

The reference aligning torque relative to the front wheel slip angle αf varies in response to a road frictional coefficient. Therefore, as illustrated in FIG. 13, when the reference aligning torque is determined with reference to the inflection point P of the actual aligning torque Tsaa, the feature of the reference aligning torque can be obtained with a higher estimating precision. For example, when the road frictional coefficient becomes relatively low, the feature of the actual aligning torque Tsaa is changed from the feature illustrated by a solid line in FIG. 13 to a feature illustrated by a broke line therein. That is, when the road frictional coefficient is decreased, the inflection point of the actual aligning torque Tsaa is moved from the point P to a point P'. Therefore, it is necessary to change the feature of the reference aligning torque denoted with a symbol Tsat from the line O-M-N to a line O-M'-N'. In this case, the point M' is determined with reference to the inflection point P'. Therefore, the reference aligning torque can be characterized in accordance with the change of the road frictional coefficient.

According to the above-described embodiment of the present invention, the grip factor ε is obtained based upon the aligning torque focusing on the change of the tire pneumatic trail. According to the other embodiment of the present invention, the tire grip factor ε can be obtained based upon the margin of the side force relative to the road frictional force.

According to a theoretical model (a brush model) of a tire cornering force, the relation between the front wheel side force Fyf and the actual aligning torque Tsaa is expressed in accordance with a following equation:

$$\xi > 0, \xi = 1 - \{Ks/(3 \cdot \mu \cdot Fz)\} \cdot \lambda$$

$$Fyf = \mu \cdot Fz \cdot (1 - \xi^3) \tag{1}$$

$$Tsaa = (l \cdot Ks/6) \cdot \lambda \cdot \xi^3 \tag{2}$$

$$\xi \geq 0, \xi = 1 - \{Ks/(3 \cdot \mu \cdot Fz)\} \cdot \lambda$$

$$Fyf = \mu \cdot Fz \tag{3}$$

$$Tsaa = 0. \tag{4}$$

A symbol Fz represents a vertical load, a symbol l represents a length of a tire tread surface being in contact with the road, a symbol Ks represents a constant value corresponding to a tread rigidity, a symbol λ represents a side slip and is expressed in accordance with an equation: λ=tan(αf), and the symbol αf represents the front wheel slip angle.

When the symbol ξ is greater than zero value, the front wheel slip angle αf is relatively small, wherein the side slip denoted with the symbol λ can be substantially equal to the front wheel slip angle αf. As being obvious from the equation (1), the maximum value of the side force is a value expressed as (μ·Fz). When a ratio of the maximum value of the side force based upon the road frictional coefficient is referred to as a road friction utilization ratio η, the road friction utilization ration η is expressed in accordance with an equation: η=1−ξ³. Therefore, a margin of the road friction is expressed by an equation: εm=1−η. When the value denoted with εm is assumed to be the vehicle wheel grip factor, εm=ξ³. Therefore, the equation (3) is expressed as follow:

$$Tsaa = (l \cdot Ks/6) \cdot \alpha f \cdot \epsilon m \tag{5}$$

The equation (5) shows that the aligning torque Tsaa is in proportion to the front wheel slip angle αf and the grip factor εm. When the grip factor εm is equal to a value 1, i.e. when the road friction utilization ratio η is a value zero and the margin relative to the road friction is a value 1, the reference aligning torque is characterized by the following equation:

$$Tsau=(1 \cdot Ks/6) \cdot \alpha f \quad (6).$$

As described above, the grip factor εm can be obtained by the equation:

$$\epsilon m=Tsaa/Tsau \quad (7).$$

Figure 14:
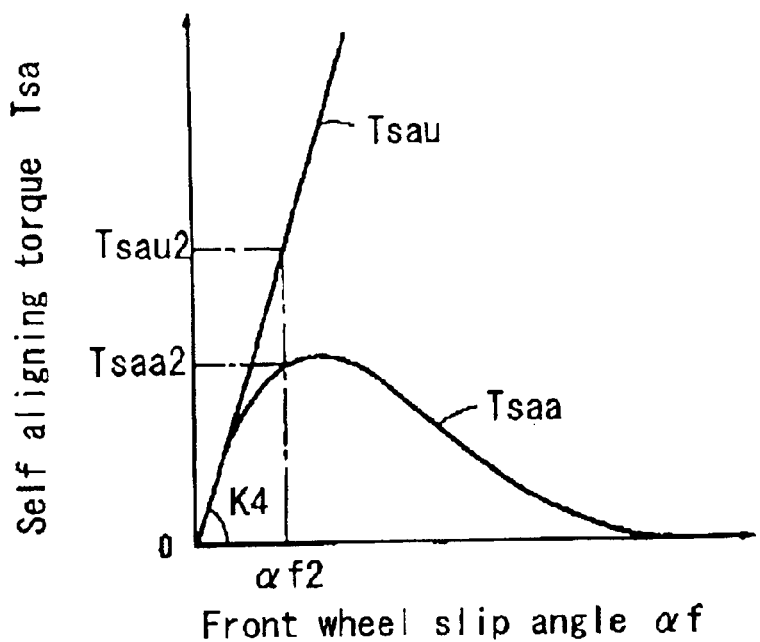
FIG. 14 is a graph illustrating a relation of the aligning torque relative to a front wheel slip angle according to the other embodiment of the present invention.

As being obvious from the equation (7), the grip factor εm can be estimated without referring to the road frictional coefficient as the parameter. As illustrated in FIG. 14, a gradient K4 (=1·Ks/6) of the reference aligning torque Tsau can be predetermined in accordance with the aforementioned brush model. Further, the gradient K4 can be experimentally determined. Still further, the gradient K4 can be obtained by setting an initial value, by identifying and correcting a gradient of the aligning torque somewhere around the area having the front wheel slip angle at a zero value during the vehicle traveling, wherein the detecting precision of the grip factor can be improved.

For example, as illustrated in FIG. 14, when the front wheel slip angle is αf2, the reference aligning torque can be calculated in accordance with the following equation;

$$Tsau2=K4 \cdot \alpha f2.$$

The grip factor εm can be calculated in accordance with the following equation;

$$\epsilon m=Tsaa2/Tsau=Tsaa2/(K4 \cdot \alpha f2).$$

Figure 15:
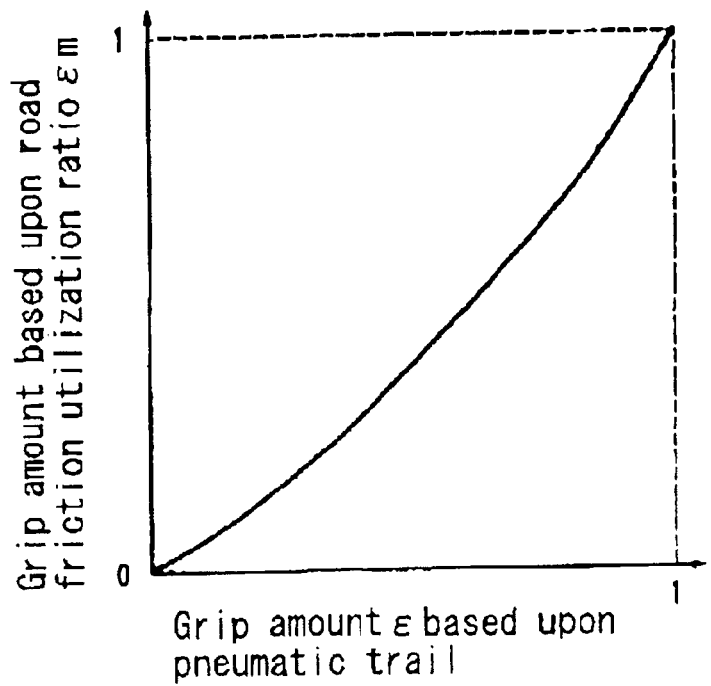
FIG. 15 is a diagram illustrating a relationship between the grip factor $\epsilon$ based upon a pneumatic trail and a grip factor $\epsilon$ m based upon the margin relative to the road friction.

As described above, the antiskid braking control can be performed by using the grip factor εm estimated based upon the margin of the road friction in substitution for the grip factor ε estimated based upon the pneumatic trail. FIG. 15 illustrates a relationship between the grip factor ε and the grip factor εm. Therefore, the calculated grip factor ε can be converted to the grip factor εm. On the other hand, the calculated grip factor εm can be converted to the grip factor ε.

Figure 16:
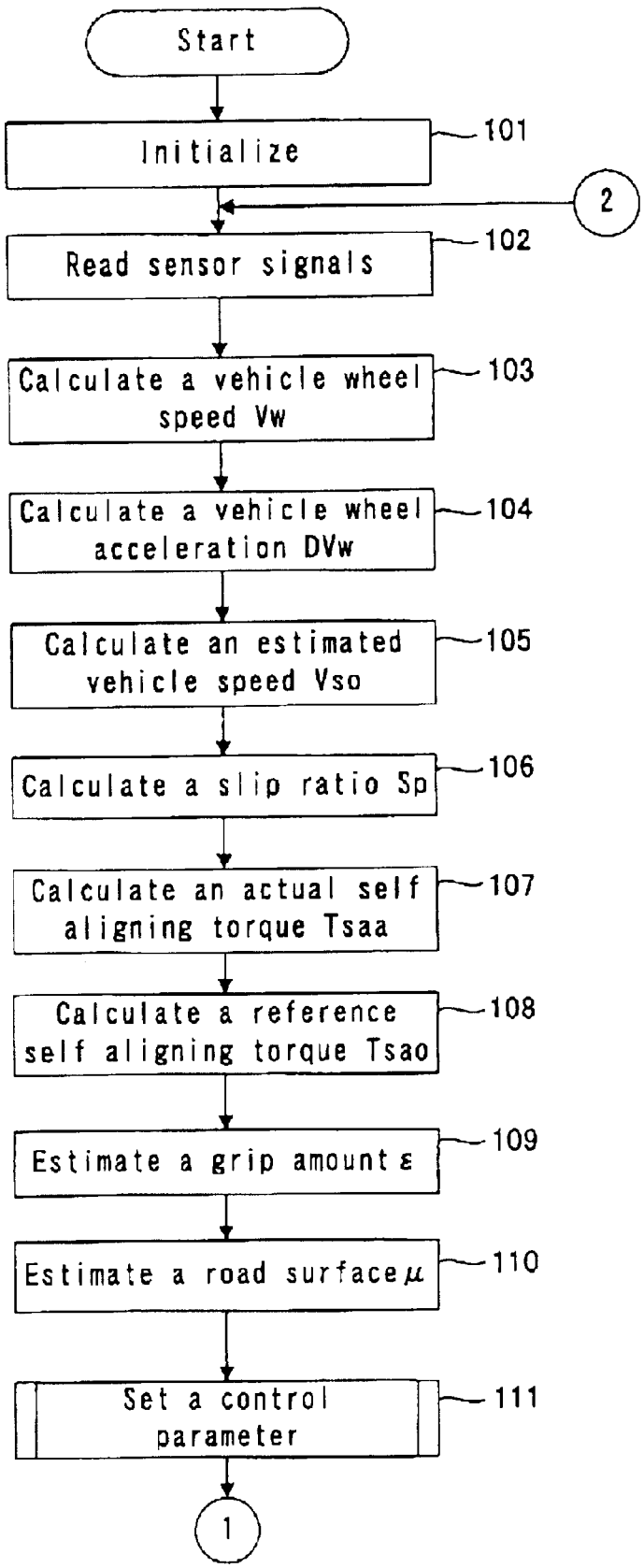
FIG. 16 is a flow chart explaining a process for performing an antiskid braking control according to the embodiment of the present invention.
Figure 17:
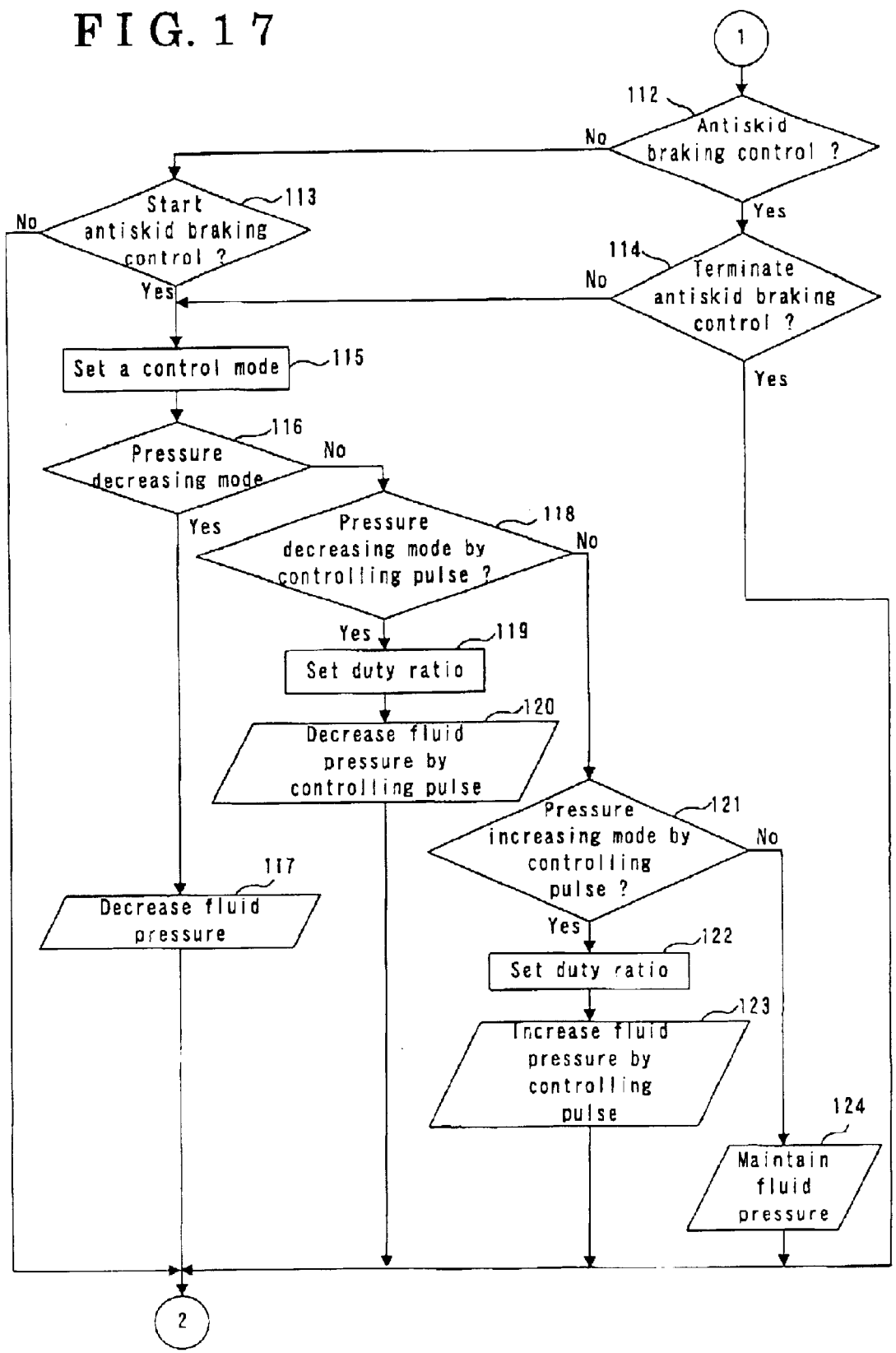
FIG. 17 is a flow chart explaining the process for performing the antiskid braking control according to the embodiment of the present invention.

According to the embodiment of the present invention, a program illustrated in the flowchart of FIGS. 16 and 17 is initiated when a series of processes for performing the antiskid braking control including the grip factor estimation has been performed, and an ignition switch (not shown) is switched on. Therefore, the program corresponding to the flowchart is repeatedly performed at a predetermined cycle. Various calculated values are initialized at step 101. Signals from various sensors are inputted to the ECU at step 102. At step 103, a vehicle wheel speed Vw for each vehicle wheel is calculated based upon each signal outputted from each vehicle wheel speed sensor WS1 through WS4. At step 104, a vehicle wheel acceleration (including deceleration) DVw is calculated by differentiating each vehicle wheel speed Vw. At step 105, an estimated vehicle speed Vso is calculated based upon the vehicle wheel speed Vw for each vehicle wheel. Alternatively, the vehicle speed can be detected by use of an antisurface sensor. A vehicle acceleration Dvso can be obtained by differentiating the estimated vehicle speed Vso. At step 106, a slip ratio Sp (=(Vso−Vw)/Vso) for each vehicle wheel is calculated based upon the vehicle wheel speed Vw for each vehicle wheel and the estimated vehicle speed Vso.

The process proceeds to step 107 for calculating the actual self-aligning torque Tsaa based upon inputted sensor signals. The steering torque Tstr applied to the steering shaft 2 is detected by the steering torque sensor TS and the EPS motor 3 is controlled in response to the value of the detected steering torque Tstr, thereby enabling to reduce the driver's steering force for turning the steering wheel. In this case, the actual aligning torque Tsaa of the front wheel tire can be balanced with torque which is generated by subtracting friction component of the steering system from the total amount of the steering torque and the torque outputted by the EPS device.

Therefore, the actual aligning torque Tsaa is expressed in accordance with an equation:

$$Tsaa=Tstr+Teps-Tfrc.$$

Figure 7:
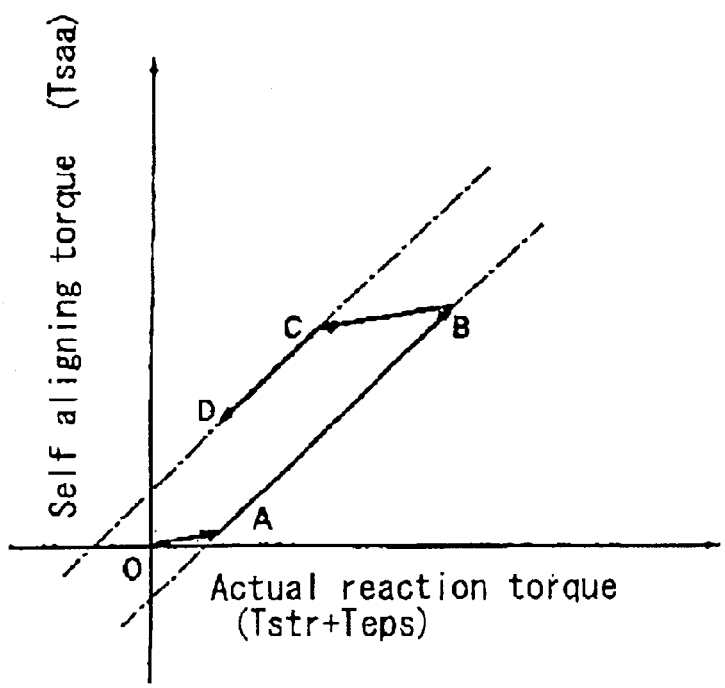
FIG. 7 is a graph illustrating a friction component of a steering system which is referred to for correcting the aligning torque according to the embodiment of the present invention.
Figure 8:
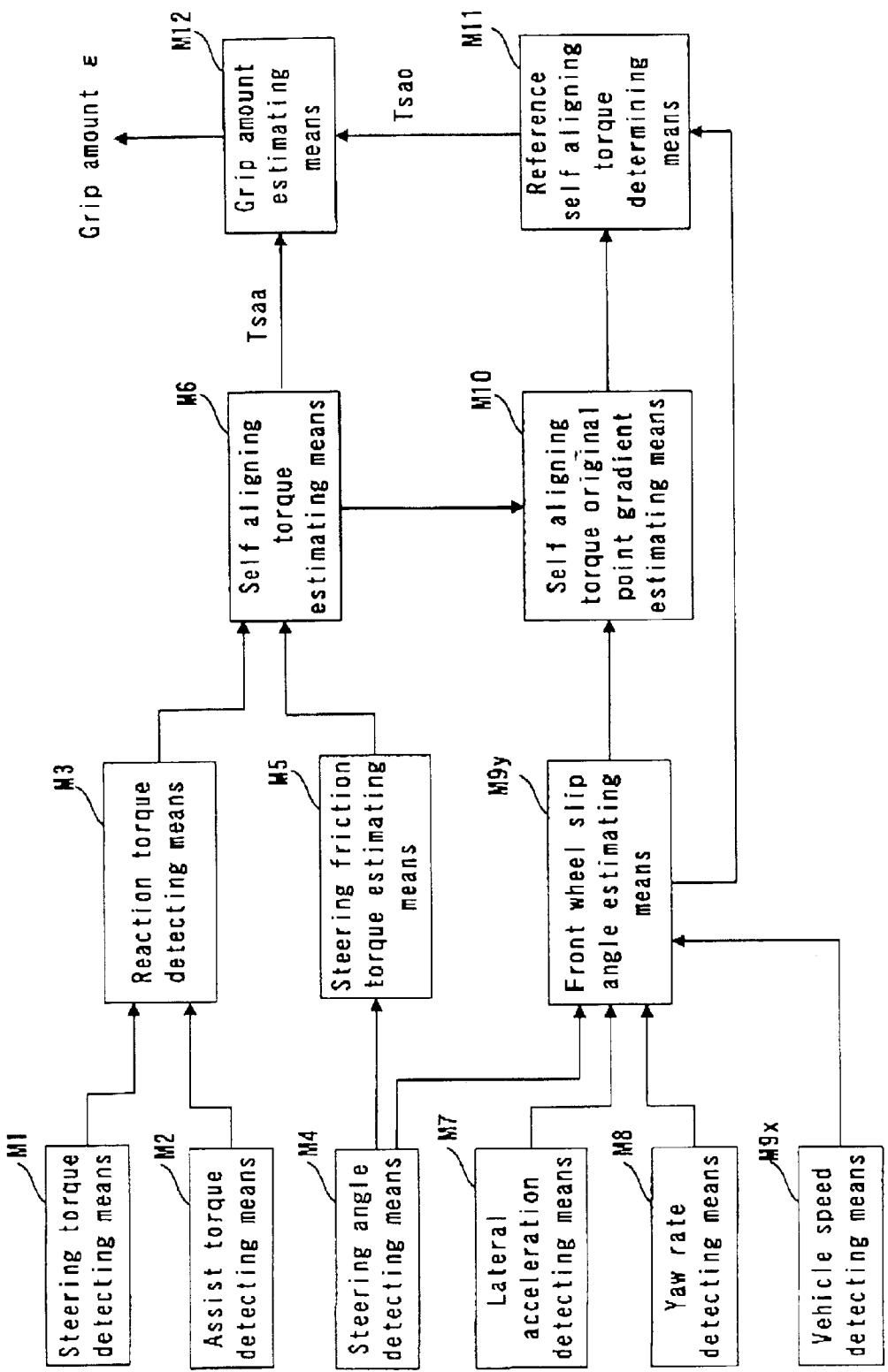
FIG. 8 is a block view explaining the estimation of the grip factor according to a modification of the embodiment of the present invention.

A symbol Tstr represents the torque applied to the steering shaft 2 in response to the driver's steering operation, and the symbol Teps represents the torque generated by the EPS device. The actual aligning torque Tsaa can be estimated based upon the motor electric current, in which the electric value applied to the EPS motor 3 is in a predetermined relation to the motor output torque. The symbol Tfrc represents the friction component of the steering system, i.e. the torque component due to friction of the steering system. The aligning torque Tsa is obtained by subtracting the friction component Tfrc from the total amount of the torques Tstr and Teps and by correcting the calculated value as a result of the subtraction. FIG. 7 explains the method of correcting the aligning torque Tsa. When the vehicle has been traveling straight, an actual reaction torque (Tstr+Teps) is not generated. When the steering wheel is turned in response to the driver's steering operation, the actual reaction torque is generated. In this case, torque is first generated, which functions for canceling Coulomb friction of a steering mechanism (not shown). The aligning torque Tsa is then generated in response to the steering operation of the front wheels FL and FR.

As illustrated by a range of zero to A in FIG. 7, the aligning torque has not been generated corresponding to the increase of the actual reaction torque at an initial stage of the steering operation from the straight movement. An estimated value of the aligning torque is outputted with a slight uphill gradient along the increase of the actual reaction torque. The aligning torque Tsa is an estimated value obtained after the correction. When the actual reaction torque exceeds a range in which the friction torque is generated, in response to the increase of the steering amount of the steering wheel, the estimated value Tsa of the aligning torque is increasingly outputted along a line from A to B in FIG. 7. When the actual reaction torque is decreased in response to the decrease of the steering amount of the steering wheel, the estimated value Tsa is outputted with a slight gradient along the actual reaction torque, as illustrated by a line from B to C. When the actual reaction torque exceeds the range in which the friction torque is generated, the estimated value Tsa is outputted along a line from C to D. According to the embodiment of the present invention, the aligning torque Tsa is estimated as described above (the aligning torque estimating means).

Going back to FIG. 16, at step 108, the reference aligning torque Tsao is calculated in the above-described manner. At step 109, the grip factor ε is estimated in the above-described manner. At step 110, the road surface μ (the maximum value) is estimated. For example, the road surface μ is estimated based upon the wheel brake cylinder pressure or the mater cylinder hydraulic pressure which is detected prior to the initial pressure decrease under the antiskid braking control. Although the road surface $\mu$ is estimated in various manners, the road surface $\mu$ can be estimated with reference to the inflection point (the point P in FIG. 12) of the actual aligning torque, according to the present invention. That is, the road surface $\mu$ can be estimated based upon the aligning torque possessing the inflection point, the front wheel slip angle, the side force, or the lateral acceleration.

At step 111, the control parameter is set. The control parameter includes a vehicle wheel slip threshold value or a vehicle wheel deceleration threshold value, which is used for judging the start of the antiskid braking control, the vehicle wheel slip threshold value or the vehicle wheel deceleration threshold value according to each control mode such as a pressure decreasing mode, a pressure maintaining mode, and a pressure increasing mode, and an activating pattern of each SOL valve according to each control mode.

As illustrated by a continuing flowchart of FIG. 17, at step 112, the ECU judges whether or not the antiskid braking control has been performed. When the antiskid braking control has not been performed yet, the process proceeds to step 113, wherein each vehicle wheel is judged whether or not to be under a locked condition based upon each vehicle wheel speed Vw and each vehicle wheel acceleration DVw. In other words, at step 113, the ECU judges whether or not the start conditions for staring the antiskid braking control have been satisfied. When the start conditions have been satisfied, the process proceeds to step 116, if not, the process returns to step 102. When the antiskid braking control has been performed at step 112, the program proceeds to step 114, wherein the ECU judges whether or not terminate conditions for terminating the antiskid braking control have been satisfied. When the terminate conditions have been satisfied at step 114, the process proceeds to step 102, if not, the process proceeds to step 115.

At step 115, any one of the control modes is selected corresponding to the locked condition of each vehicle wheel. The control modes include a pressure decreasing mode, a pressure decreasing mode by pulse cycle per unit of time, a pressure increasing mode by pulse cycle per unit of time, and a pressure maintaining mode. Hydraulic pressure control signals are outputted in accordance with each control mode. Each SOL valve PC1 through PC8 is electrically excited or not in accordance with each control mode, thereby increasing, decreasing or maintaining the brake pressure in each wheel brake cylinder Wfr, Wfl, Wrr, and Wrl. At steps 119 and 122, duty ratio is set corresponding to the pressure decreasing mode by pulse cycle per unit of time and the pressure increasing mode by pulse cycle per unit of time, respectively.

Figure 18:
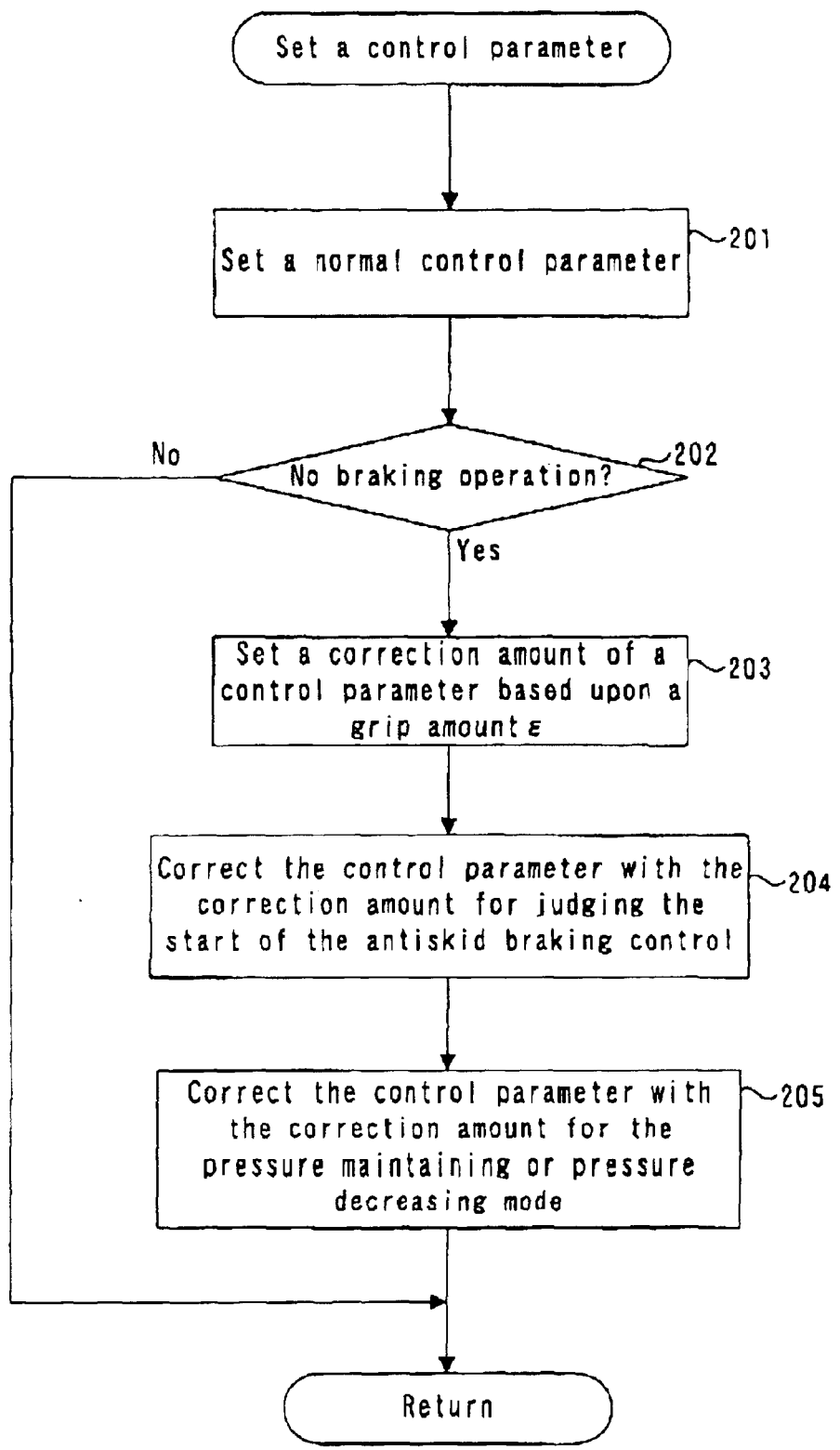
FIG. 18 is a flow chart explaining set of a control parameter according to the embodiment of the present invention.

The process performed at step 111 in FIG. 16 is executed in accordance with a flowchart illustrated in FIG. 18. The normal control parameter is determined at step 201. The normal control parameter includes the vehicle wheel slip threshold value and the vehicle wheel deceleration threshold value, which are used for the normal antiskid braking control, the activating pattern of the SOL valves under each control mode such as the pressure decreasing mode, the pressure maintaining mode, and the pressure increasing mode. The vehicle wheel slip threshold value is a reference value of the slip ratio Sp calculated at step 106, which is used for judging the start of the antiskid braking control. The vehicle wheel deceleration threshold value is a reference value of the vehicle wheel acceleration (including deceleration) calculated at step 104, which is used for judging the start of the antiskid braking control.

The vehicle wheel grip factor $\epsilon$ can be considered to be the road surface friction utilization ratio of the vehicle wheel side force. When the braking force applied to the vehicle wheel is relatively high, the road surface friction is used for braking and the grip factor $\epsilon$ is detected at a relatively low amount. Therefore, when the brake operation is performed by the driver, it is preferable to prevent the setting of the control parameter. Therefore, at step 202, the ECU judges whether or not the braking operation has been performed by the driver. When the braking operation has been performed by the driver, the following correction of the control parameter is not performed. When the braking load applied to the vehicle wheel is relatively low, the decrease of the grip factor $\epsilon$ is only slight. In this case, at step 202, the ECU can judge whether or not the braking operations has been equal to or less than a predetermined braking force. The braking force can be represented by a brake pedal stroke, the master cylinder hydraulic pressure, depression applied to the brake pedal, the wheel brake cylinder pressure, and the like.

Figure 19:
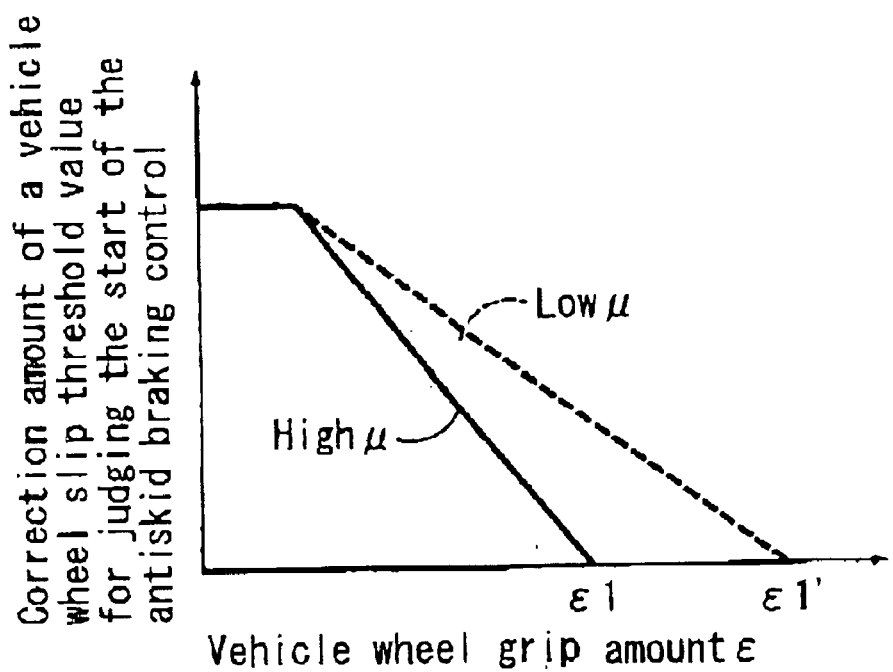
FIG. 19 is a graph illustrating a map of a vehicle wheel slip threshold value correction amount for judging the start of the antiskid braking control relative to the grip factor $\epsilon$ according to the embodiment of the present invention.
Figure 20:
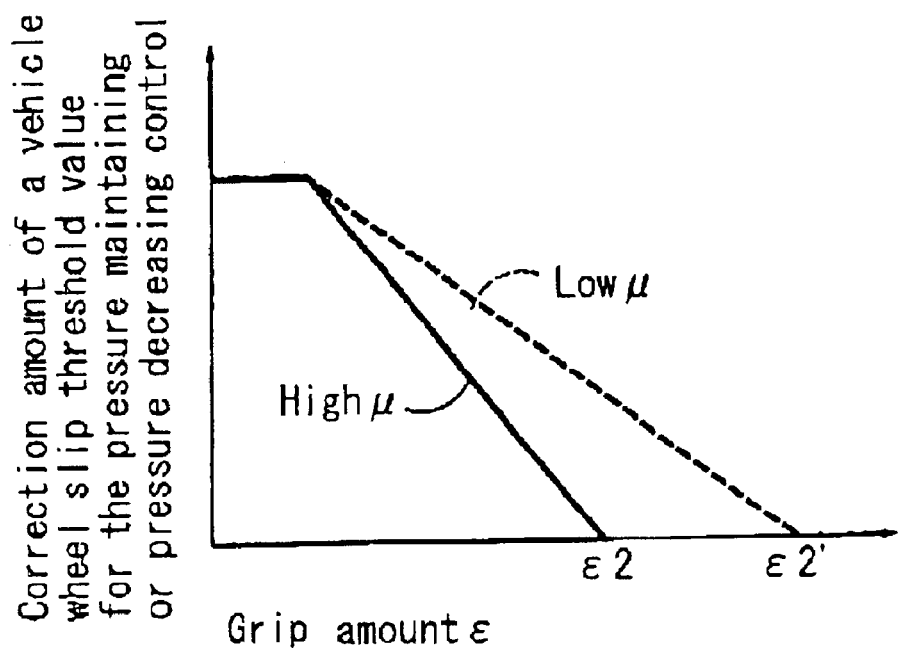
FIG. 20 is a graph illustrating a map of a vehicle wheel slip threshold value correction amount for the pressure maintaining control or the pressure decreasing control relative to the grip factor $\epsilon$ according to the embodiment of the present invention.

At step 202, when the brake operation has not been performed by the driver, the process proceeds to step 203, wherein a correction amount of the control parameter is determined based upon the grip factor $\epsilon$. As illustrated in FIG. 19, the correction amount of the vehicle wheel slip threshold value is determined for judging the start of the antiskid braking control when the grip factor $\epsilon$ becomes equal to or less than a predetermined value $\epsilon 1$. Further, the correction amount is increased in accordance with the decrease of the grip factor $\epsilon$. In the same manner, as illustrated in FIG. 20, the correction amount of the vehicle wheel slip threshold value for the pressure maintaining mode or the pressure decreasing mode is determined when the grip factor $\epsilon$ becomes equal to or less than a predetermined value $\epsilon 2$. Further, the correction amount is increased in accordance with the decrease of the grip factor $\epsilon$.

At step 204 (i.e. a control parameter adjusting means), the vehicle wheel slip threshold value for judging the start of the antiskid braking control is set to be lower by the correction amount which was set at step 203. As a result, when the grip factor $\epsilon$ is relatively low, i.e. when the side force is somewhere around the limit of the grip factor during the vehicle turning, the antiskid braking control can be easily performed at an earlier timing than the normal timing of the pressure decrease. Therefore, the vehicle can be effectively decelerated maintaining the vehicle turning condition. Further, as illustrated with a broken line in FIG. 19, it is preferable to change the start for determining the correction amount from the predetermined value $\epsilon 1$, which is employed on the road with the road surface $\mu$, to a predetermined value $\epsilon 1'$, when the road surface $\mu$ is relatively low, thereby enabling to further enhance the vehicle stability.

Next, at step 205 (i.e. the control parameter adjusting means), the vehicle wheel slip threshold value for the pressure maintaining mode or for the pressure decreasing mode is determined to be lower by the correction amount, which was determined at step 203. In this case, the pressure maintaining control or the pressure decreasing control can be easily performed. When the grip factor $\epsilon$ is relatively low, i.e. when the side force is somewhere around the limit of the grip factor during the vehicle turning, the brake pressure can be maintained or decreased at an earlier timing than the normal timing of the pressure decrease, wherein the vehicle can be decelerated maintaining the vehicle turning condition. Further, as illustrated with a broken line in FIG. 20, it is preferable to change the start for determining the correction amount from the predetermined value $\epsilon 2$, which is employed on the road with the relatively high road surface $\mu$, to a predetermined value $\epsilon 2'$ when the road surface $\mu$ is relatively low, thereby enabling to further enhance the vehicle stability.

Figure 21:
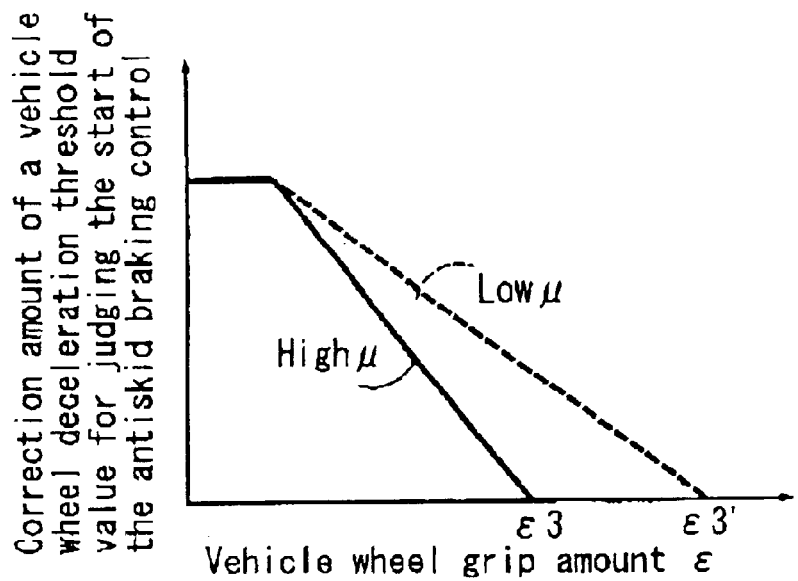
FIG. 21 is a graph illustrating a map of a vehicle wheel deceleration threshold value correction amount for judging the start of the antiskid braking control relative to the grip factor $\epsilon$ according to the embodiment of the present invention.

As illustrated in FIG. 21, the correction amount of the vehicle wheel deceleration threshold value is set for judging the start of the antiskid braking control when the grip factor $\epsilon$ is substantially equal to or less than a predetermined value $\epsilon 3$. Therefore, at step 201, the vehicle wheel deceleration threshold value is set as the normal control parameter for judging the start of the antiskid braking control. At step 204, the vehicle wheel deceleration threshold value is set to be lower by the correction amount set at step 203. As a result, the antiskid braking control can be easily performed at an earlier timing than the normal timing of the pressure decrease. Therefore, the vehicle can be effectively decelerated maintaining the vehicle turning condition. Further, as illustrated with a broken line in FIG. 21, it is preferable to change the start for determining the correction amount from the predetermined value $\epsilon 3$, which is employed on the road with the relatively high road surface $\mu$, to a predetermined value $\epsilon 3'$ when the road surface a is relatively low, thereby enabling to further enhance the braking performance while the vehicle turns.

Figure 22:
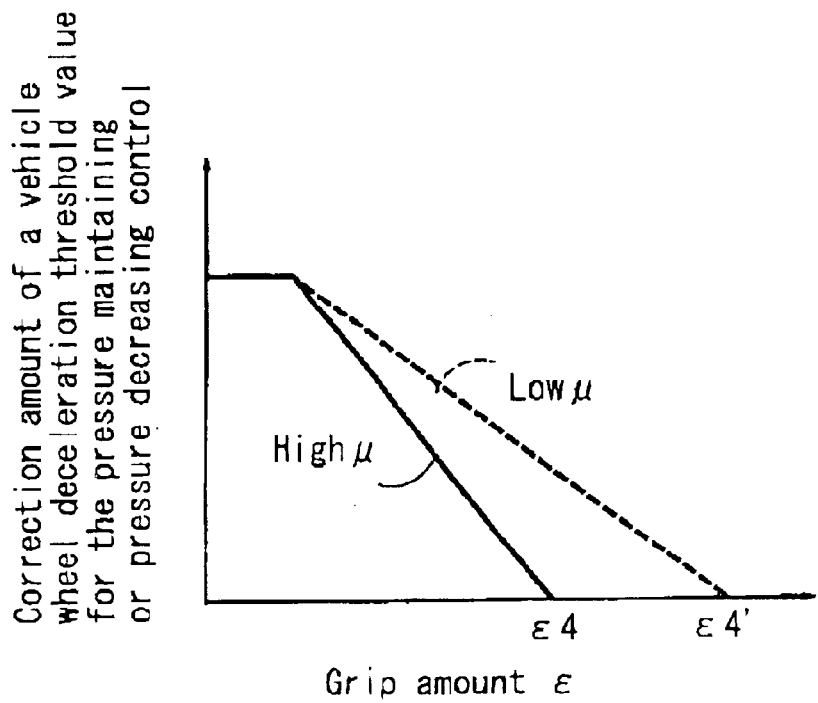
FIG. 22 is a graph illustrating a map of a vehicle deceleration threshold value correction amount for the pressure maintaining control or the pressure decreasing control relative to the grip factor $\epsilon$ according to the embodiment of the present invention.

As illustrated in FIG. 22, the correction amount of the vehicle wheel deceleration threshold value is set for the pressure maintaining mode or for the pressure decreasing mode when the grip factor $\epsilon$ is substantially equal to or less than a predetermined value $\epsilon 4$. Therefore, at step 201, the vehicle wheel deceleration threshold value is set as the normal control parameter. At step 205, the vehicle wheel deceleration threshold value is set to be lower by the correction amount set at step 203. As a result, the pressure maintaining control or the pressure decreasing control may be able to be easily performed and the antiskid braking control can be easily performed at an earlier timing than the normal timing of the pressure decrease. Further, as illustrated with a broken line in FIG. 22, it is preferable to change the start for determining the correction amount from the predetermined value $\epsilon 4$, which is employed on the road with the relatively high road surface $\mu$, to a predetermined value $\epsilon 4'$ when the road surface $\mu$ is relatively low, thereby enabling to further enhance the braking performance while the vehicle turns.

Figure 23:
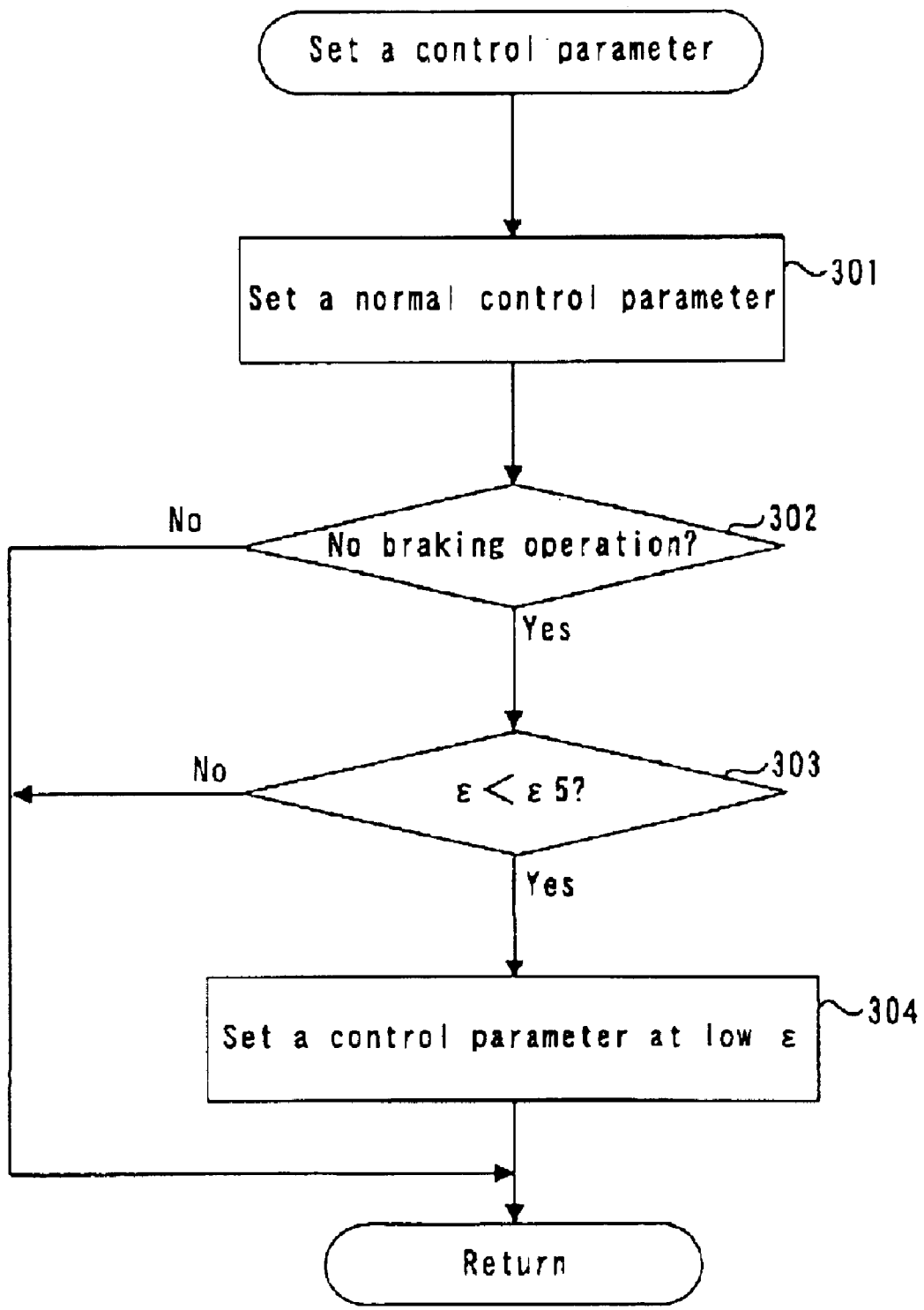
FIG. 23 is a flow chat explaining setting of the control parameter according to the modification of the embodiment of the present invention.

A flowchart in FIG. 23 explains a method of setting the control parameter according to other mode of the embodiment At step 301, the normal control parameter is determined. At step 302, the ECU judges whether or not the braking operation has been performed by the driver, or whether or not the brake amount is equal to or less than the predetermined amount. At step 303, when the grip factor $\epsilon$ is judged to be less than a predetermined value $\epsilon 5$, the process proceeds to step 304 (i.e. the control parameter adjusting means), wherein the control parameter is determined under the condition of the low $\epsilon$. In order to start the antiskid braking control earlier, the control parameters for the low $\epsilon$ should be determined at a lower value than the normal value. The control parameters include the vehicle wheel slip threshold value and/or the vehicle wheel deceleration threshold value, which are used for judging the start of the antiskid braking control, the vehicle wheel slip threshold value for the pressure maintaining control or the pressure decreasing control, and/or the vehicle wheel deceleration threshold value for the pressure maintaining control or the pressure decreasing control. Therefore, when the antiskid braking control is required with the decrease of the grip factor $\epsilon$ during the vehicle turning, the antiskid braking control can be performed at an earlier timing than the normal timing of the pressure decrease, thereby enabling to maintain the side force and assuring a stable vehicle turn.

Figure 24:
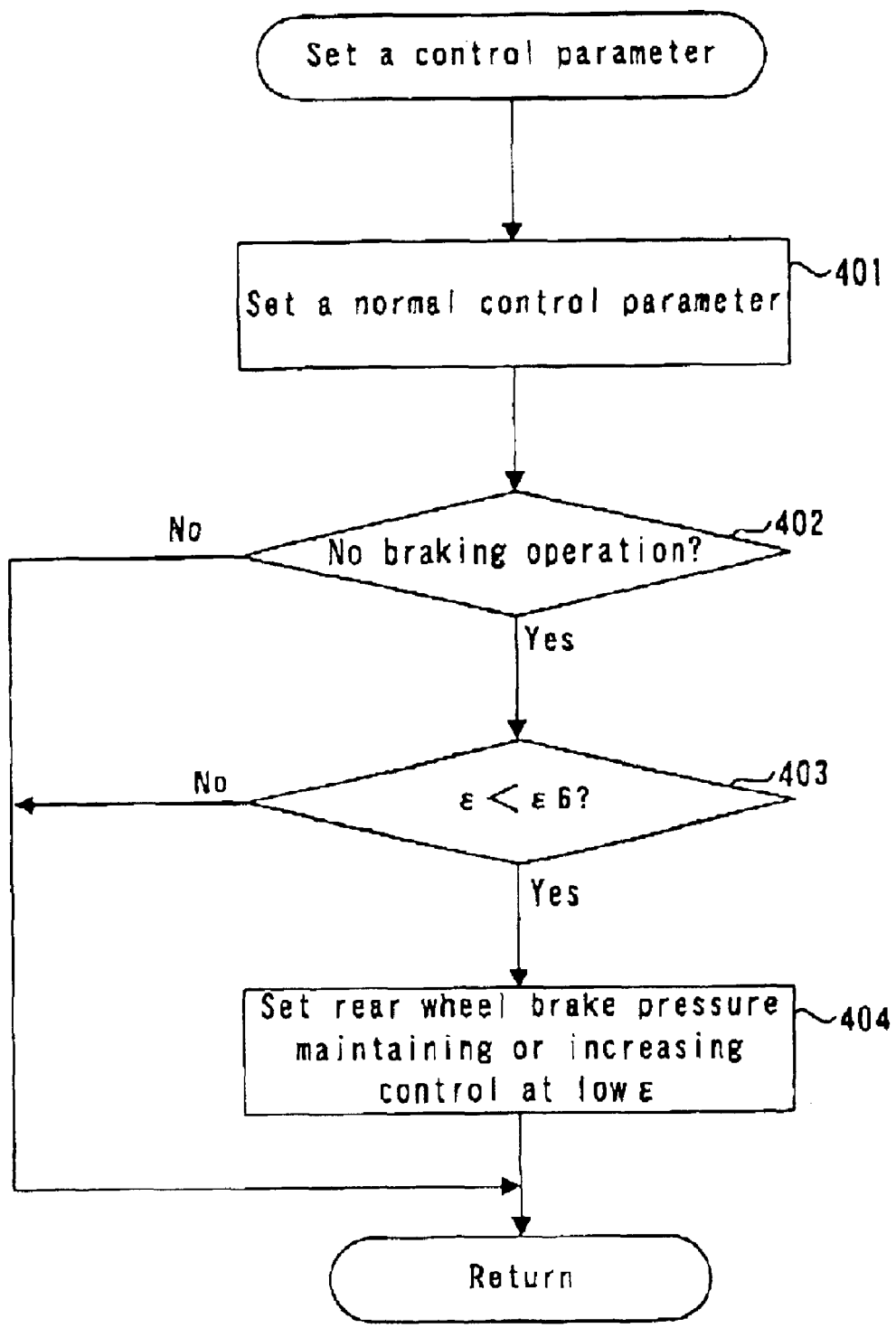
FIG. 24 is a flow chart explaining setting of the control parameter according to the modification of the embodiment of the present invention.

Especially, it is preferable to maintain the side force applied to the vehicle rear wheel in order to assure the vehicle stability during the vehicle turning. The control parameter for the rear wheel is determined in the following manner as illustrated by the flowchart in FIG. 24. At step 401, the normal control parameter is determined. At step 402, when the braking operation has not been performed by the driver, or when the braking amount is equal to or less than the predetermined braking amount, the process proceeds to step 403. At step 403, when the grip factor $\epsilon$ is judged to be less than a predetermined value $\epsilon 6$, the process proceeds to step 404 (i.e. the control parameter adjusting means), wherein control parameters such as for a pressure maintaining mode for the rear wheel brake pressure control, for the pressure maintaining mode for the rear wheel brake pressure control, or for the pressure increasing mode for the rear wheel brake pressure control are set for the condition of the low $\epsilon$.

Figure 25:
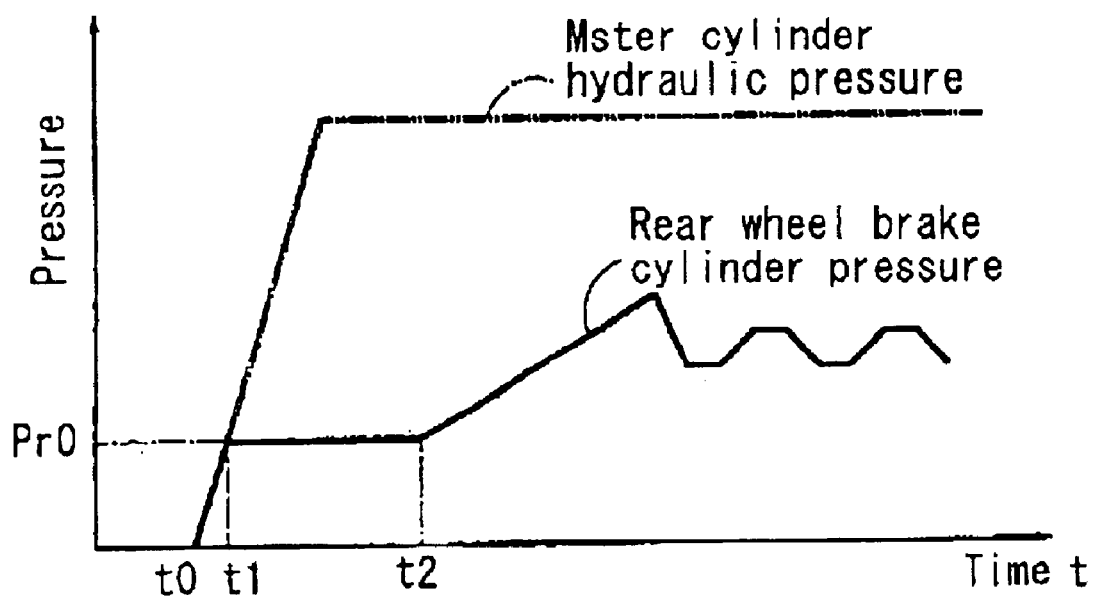
FIG. 25 is a time chart illustrating a map referred to for setting the control parameter by the process illustrated in the flow chart of FIG. 24.

The control parameter for the rear wheel brake pressure control for the condition of the low $\epsilon$ is designed to increase the brake pressure supplied to the rear wheel up to a predetermined level, to maintain the pressure level for a predetermined time, and to gradually increase the pressure with an uphill gradient along an elapsed time. As seen in FIG. 25, the brake pressure in the rear wheel brake cylinder is characterized with a solid line and the maser cylinder hydraulic pressure is characterized with a chain double-dashed line. Therefore, the side force applied to the rear wheel can be assured by the rear wheel pressure control. In this case, the vehicle stability can be sufficiently assured when the antiskid braking control is performed during the vehicle turning.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. An antiskid braking control system comprising:

a braking force generating means for generating braking force applied to a vehicle wheel;

a braking force controlling means for controlling the braking force generated by the braking force generating means; and a wheel speed detecting means for detecting a rotational speed of a wheel, wherein a control parameter for the braking force controlling means is determined based upon at least the wheel speed detected by the wheel speed detecting means, and the braking force controlling means is, controlled in accordance with the determined control parameter, a steering factor detecting means for detecting at least one of steering factors including a steering torque and steering effort applied to a steering system extending from a steering wheel to a suspension of a vehicle;

an aligning torque estimating means for estimating aligning torque produced on at least a wheel of the vehicle on the basis of the steering factor detected by the steering factor detecting means;

a vehicle state variable detecting means for detecting a state variable of the vehicle;

a wheel factor estimating means for estimating at least one of wheel factors including a side force and slip angle applied to the wheel on the basis of the state variable detected by the vehicle state variable detecting means;

a grip factor estimating means for estimating a grip factor of at least a tire of the wheel, in accordance with a relationship between the alignment torque estimated by the aligning torque estimating means and the wheel factor estimated by the wheel factor estimation means; and a control parameter adjusting means for adjusting the control parameter based upon the grip factor estimated by the grip factor estimating means.

2. An antiskid braking control system according to claim 1, further comprising:

a reference aligning torque setting means for setting a reference aligning torque on the basis of the wheel factor estimated by the wheel factor estimating means and the aligning torque estimated by the aligning torque estimating means, wherein the grip factor estimating means is adapted to estimate the grip factor of the tire on the basis of a result of comparison between the aligning torque estimated by the aligning torque estimating means and the reference aligning torque setting means.

3. An antiskid braking control system according to claim 1, wherein the control parameter adjusting means adjusts a control start threshold value for staring the braking force control by the braking force controlling means based upon the grip factor estimated by the grip factor estimating means.

4. An antiskid braking control system according to claim 2, wherein the control parameter adjusting means adjusts a control start threshold value for staring the braking force control by the braking force controlling means based upon the grip factor estimated by the grip factor estimating means.

5. An antiskid braking control system according to claim 1, wherein the control parameter adjusting means adjusts a control amount of the braking force by the braking force controlling means based upon the grip factor estimated by the grip factor estimating means.

6. An antiskid braking control system according to claim 2, wherein the control parameter adjusting means adjusts a control amount of the braking force by the gracing force controlling means based upon the grip factor estimated by the grip factor estimating means.

* * * * *

UNITED STATES PATENT AND TRADEMARK OFFICE
CERTIFICATE OF CORRECTION

PATENT NO. : 6,792,343 B2 Page 1 of 1
DATED : September 14, 2004
INVENTOR(S) : Yoshiyuki Yasui et al.

It is certified that error appears in the above-identified patent and that said Letters Patent is hereby corrected as shown below:

Column 18,
Line 56, change "is," to -- is --.

Column 20,
Line 21, change "gracing" to -- braking --.

Signed and Sealed this

Twenty-second Day of February, 2005

JON W. DUDAS
*Director of the United States Patent and Trademark Office*